United States Patent
Jung et al.

(10) Patent No.: US 11,316,629 B2
(45) Date of Patent: Apr. 26, 2022

(54) METHOD CARRIED OUT BY ELECTRONIC DEVICE COMPRISING SECURE ELEMENT, AND ELECTRONIC DEVICE

(71) Applicant: Samsung Electronics Co., Ltd., Gyeonggi-do (KR)

(72) Inventors: Jieun Jung, Gyeonggi-do (KR); Jeongdon Kang, Gyeonggi-do (KR); Sungoh Kim, Gyeonggi-do (KR); Jaehyeon Seo, Gyeonggi-do (KR); Sangsoo Lee, Gyeonggi-do (KR); Sanghwi Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/978,317

(22) PCT Filed: Mar. 6, 2019

(86) PCT No.: PCT/KR2019/002609
§ 371 (c)(1),
(2) Date: Sep. 4, 2020

(87) PCT Pub. No.: WO2019/172653
PCT Pub. Date: Sep. 12, 2019

(65) Prior Publication Data
US 2021/0006358 A1     Jan. 7, 2021

(30) Foreign Application Priority Data
Mar. 6, 2018    (KR) ........................ 10-2018-0026513

(51) Int. Cl.
*H04M 3/00*     (2006.01)
*H04L 1/18*     (2006.01)
(Continued)

(52) U.S. Cl.
CPC ............... *H04L 1/189* (2013.01); *H04W 4/50* (2018.02); *H04W 52/0225* (2013.01)

(58) Field of Classification Search
CPC ..... H04L 1/189; H04L 67/306; H04L 63/102; H04L 1/188; H04W 4/50; H04W 52/0225;
(Continued)

(56) References Cited

U.S. PATENT DOCUMENTS 8,503,376 B2    8/2013   Cha et al.
9,615,250 B2    4/2017   Bruner et al.
(Continued)

FOREIGN PATENT DOCUMENTS

JP           5432156 B2    12/2013
KR    10-2014-0064601 A    5/2014
(Continued)

OTHER PUBLICATIONS

GSM Association; RSP Technical Specification Version 2.2; Sep. 1, 2017. 265 pages.
Korean Search Report dated Feb. 24, 2022.

*Primary Examiner* — Tanmay K Shah
(74) *Attorney, Agent, or Firm* — Cha & Reiter, LLC.

(57) ABSTRACT

An electronic device, according to one embodiment, comprises: a wireless communication circuit for providing at least one cellular wireless communication; a secure element comprising profile information associated with the wireless communication, the profile information including notification configuration information; at least one processor operatively connected to the wireless communication circuit and the secure element; and a memory operatively connected to the at least one processor, wherein the at least one processor may acquire the notification configuration information from the secure element, transmit a notification associated with profile management to an external server, acquire a response
(Continued)

indicating the failure of the notification from the external server as a response to the notification, and retry transmitting the notification on the basis of the notification configuration information. In addition, various embodiments are possible as identified in the specification.

9 Claims, 16 Drawing Sheets

(51) Int. Cl.
*H04W 4/50* (2018.01)
*H04W 52/02* (2009.01)

(58) Field of Classification Search
CPC ......... H04W 12/08; H04W 8/20; H04W 8/18; H04W 8/183; H04W 8/205; H04W 12/06; G06F 21/77; G06F 21/35; Y02D 30/70
USPC ........................................................ 455/419
See application file for complete search history.

(56) References Cited

U.S. PATENT DOCUMENTS

| | | |
|---|---|---|
| 9,706,407 B2 | 7/2017 | Seo et al. |
| 2015/0281964 A1 | 10/2015 | Seo et al. |
| 2016/0057654 A1* | 2/2016 | Backholm ............. H04W 24/02 |
| | | 370/236 |
| 2017/0034849 A1* | 2/2017 | Kanamarlapudi .... H04L 1/1896 |
| 2017/0094512 A1* | 3/2017 | Kiss .................... H04L 63/0884 |
| 2017/0142121 A1 | 5/2017 | Lee et al. |
| 2017/0215063 A1 | 7/2017 | Wozniac et al. |
| 2017/0230870 A1* | 8/2017 | Shi .................... H04W 36/0022 |
| 2017/0318465 A1 | 11/2017 | Seo et al. |
| 2018/0060199 A1* | 3/2018 | Li ........................... G06F 21/45 |
| 2018/0213393 A1* | 7/2018 | Park ........................ H04L 67/30 |
| 2020/0007655 A1* | 1/2020 | Namiranian ............ H04L 67/34 |
| 2020/0351656 A1* | 11/2020 | Johansson ............... H04W 8/18 |

FOREIGN PATENT DOCUMENTS

| | | |
|---|---|---|
| KR | 10-2017-0095355 A | 8/2017 |
| KR | 10-2017-0130801 A | 11/2017 |

* cited by examiner

METHOD CARRIED OUT BY ELECTRONIC DEVICE COMPRISING SECURE ELEMENT, AND ELECTRONIC DEVICE

CROSS REFERENCE TO RELATED APPLICATIONS

This application is a National Phase Entry of PCT International Application No. PCT/KR2019/002609, which was filed on Mar. 6, 2019, and claims a priority to Korean Patent Application No. 10-2018-0026513, which was filed on Mar. 6, 2018, the contents of which are incorporated herein by reference.

TECHNICAL FIELD

Embodiments disclosed in this specification relate to a wireless communication technology using a secure element embedded in an electronic device.

BACKGROUND ART

A secure element is an element for secure transaction and security maintenance in an electronic device. For example, the secure element may be implemented, for example, in the form removable from the electronic device or embedded in the electronic device. For example, the secure element may include a universal integrated circuit card (UICC) or an embedded UICC (eUICC).

The UICC is a smart card capable of operating as a module for user authentication in the electronic device. Depending on the communication scheme, the UICC may be referred to as a "subscriber identity module (SIM) card" or a "universal SIM (USIM) card".

A case where eUICC embedded in electronic devices is used has recently increased. The eUICC may download and use profiles in the over the air (OTA) scheme to receive the mobile communication service of a mobile network operator (MNO).

When the profile management operation is successfully performed in the eUICC, the result of the profile management operation is transmitted to a remote entity (e.g., SM-DP+ server). This process may be referred to as a "notification".

DISCLOSURE

Technical Problem

According to an embodiment, a local profile assistant (LPA) in eUICC may transmit the generated notification to a remote entity, and may obtain a response to the notification from the remote entity. In this case, the response may indicate the success of the notification (success response) or may also indicate the failure of the notification (failure response). When the response is not a success response, the LPA may retry the notification. In this case, the retry may be repeated until the success response is obtained, thereby occurring waste of resources or waste of power in an electronic device.

In various embodiments disclosed in the specification, it is possible to suggest a method of retrying a notification associated with a secure element included in an electronic device.

Technical Solution

According to an embodiment disclosed in this specification, an electronic device may include a wireless communication circuit providing at least one cellular wireless communication, a secure element including profile information including notification configuration information as profile information associated with the wireless communication, at least one processor operatively connected to the wireless communication circuit and the secure element, and a memory operatively connected to the at least one processor. The at least one processor may be configured to obtain the notification configuration information from the secure element, to transmit a notification associated with profile management to an external server, and obtain a response indicating a failure of the notification from the external server, in response to the notification, and to retry transmission of the notification based on the notification configuration information.

Furthermore, according to an embodiment disclosed in this specification, a method may include obtaining profile information including notification configuration information from the secure element, transmitting a notification associated with profile management to an external server, obtaining a response indicating a failure of the notification from the external server, in response to the notification, and retrying the notification based on the notification configuration information.

Advantageous Effects

According to the embodiments disclosed in this specification, an electronic device may efficiently retry a notification associated with a secure element to an external server.

According to the embodiments disclosed in this specification, it is possible to reduce waste of resources or waste of power by efficiently setting the retry of the notification associated with the secure element.

Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Hereinafter, various embodiments of the disclosure will be described with reference to accompanying drawings. However, those of ordinary skill in the art will recognize that modification, equivalent, and/or alternative on various embodiments described herein may be variously made without departing from the scope and spirit of the disclosure.

Figure 1:
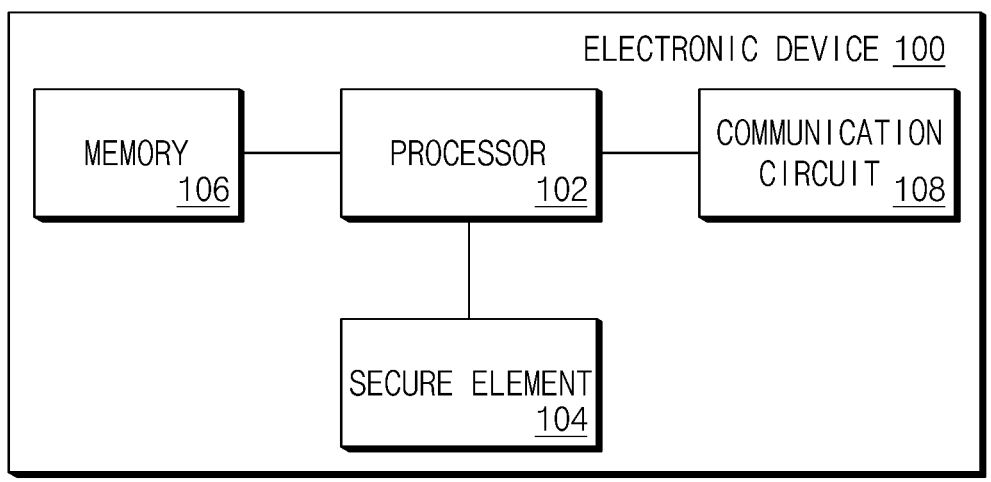
FIG. 1 is a block diagram schematically illustrating a configuration of an electronic device according to an embodiment.

FIG. 1 is a block diagram schematically illustrating a configuration of an electronic device according to an embodiment.

According to an embodiment, an electronic device 100 may include at least one of a processor 102, a secure element 104, a memory 106, or a communication circuit 108. The configuration of the electronic device 100 illustrated in FIG. 1 is an example and is variously changed to implement various embodiments disclosed in this specification. For example, the electronic device 100 may include a configuration of an electronic device 1601 illustrated in FIG. 16, or may be appropriately changed or modified by using the configurations.

According to an embodiment, the processor 102 may execute various operations disclosed in the specification or may execute instructions stored in the memory 106; the processor 102 may perform an operation according to various embodiments of the disclosure or may control any other components for the purpose of performing the operation. For example, the processor 102 may transmit a command message or a request message to the secure element 104 and may receive a response message. The processor 102 may store information in the memory 106 or may read the information stored in the memory 106, for an operation associated with the secure element 104. The processor 102 may communicate with an external device through the communication circuit 108. According to an embodiment, the processor 102 may include an application processor and/or a communication processor.

According to an embodiment, the processor 102 may support a wired communication or a wireless communication, which is associated with the profile stored in the secure element 104. The processor 102 may interact with a user through a display. In addition, at least part of operations of the processor 102 may refer to global systems for mobile communications association (GSMA)-related technical specifications (hereinafter, GSMA remote subscriber identity module (SIM) provisioning (RSP) technical specifications) such as "SGP. 22-RSP spec version X", "SGP. 21-RSP spec version X" (where 'X' is everything), or the like.

According to an embodiment, the secure element 104 (e.g., a subscriber identification module 1696 of FIG. 16) may store at least one profile. According to an embodiment, the secure element 104 may store profile information. The secure element 104 may store an identification indicating the profile. The electronic device 100 may access the profile information, using application programming interfaces.

According to an embodiment, the profile may be information that is provisioned in the secure element 104 or managed in the secure element 104. The profile may correspond to a wireless communication service provided by a cellular network. For example, a profile stored in the electronic device 100 may correspond to a wireless communication service provided to the electronic device 100.

According to an embodiment, the secure element 104 may manage a profile depending on the command, command request, or request of the processor 102 and may deliver a response to the processor 102. In addition, the operation of the secure element 104 according to various embodiments disclosed in the specification may conform to the GSMA-related technical specifications.

According to an embodiment, the secure element 104 may be a software configuration or a hardware configuration. For example, the secure element 104 may be a configuration embedded in an electronic device for secure transaction and security maintenance. The secure element 104 may be, for example, an embedded SIM (eSIM) or an eUICC. The secure element 104 may be stored in the memory 106. Hereinafter, in the embodiment disclosed in the specification, the operation of the electronic device 100 will be described using eUICC as an example. However, the secure element 104 may be various configurations providing the corresponding function in addition to the eUICC.

According to an embodiment, the memory 106 (e.g., a memory 1630 of FIG. 16) may store information for supporting a service according to a profile. The memory 106 may store information generated by the processor 102. The memory 106 may store a protocol stack supporting a specific communication protocol. According to an embodiment, the memory 106 may store the instructions which cause the processor 102 to perform an operation according to an embodiment of the disclosure. The memory 106 according to an embodiment may include the secure element 104 in a part of an area. Besides, the memory 106 may store various pieces of information according to an embodiment of the disclosure.

According to an embodiment, the communication circuit 108 may communicate with an external device over a network. For example, the communication circuit 108 may communicate with a network by using wired communication or wireless communication associated with a specific profile. The wired communication or wireless communication service may be provided by an MNO. According to an embodiment, the wireless communication may comply with a cellular communication protocol.

Figure 16:
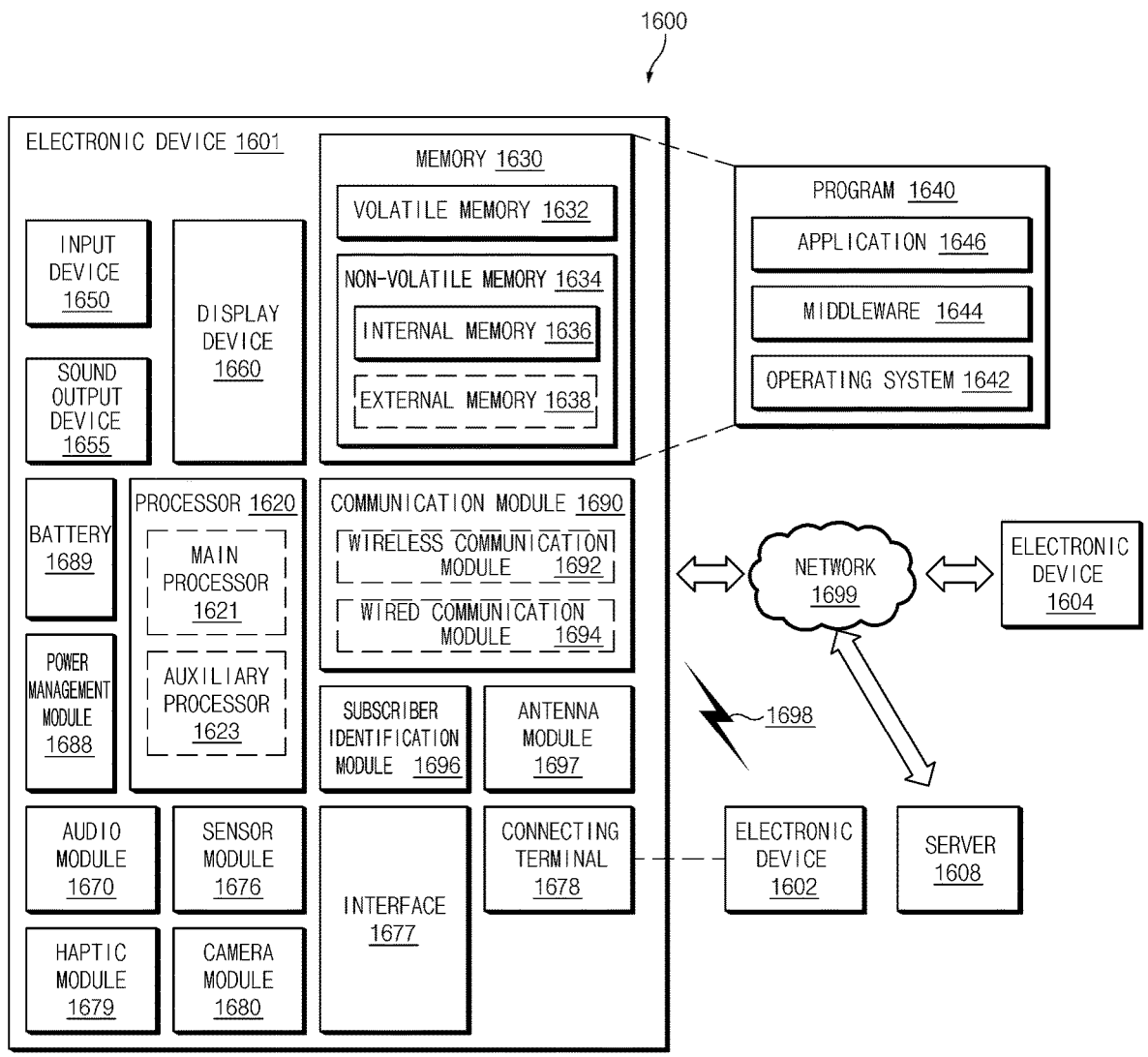
FIG. 16 is a block diagram of an electronic device in a network environment according to various embodiments.

According to an embodiment, the communication circuit 108 may be included in a communication module 1690 of FIG. 16.

Figure 2:
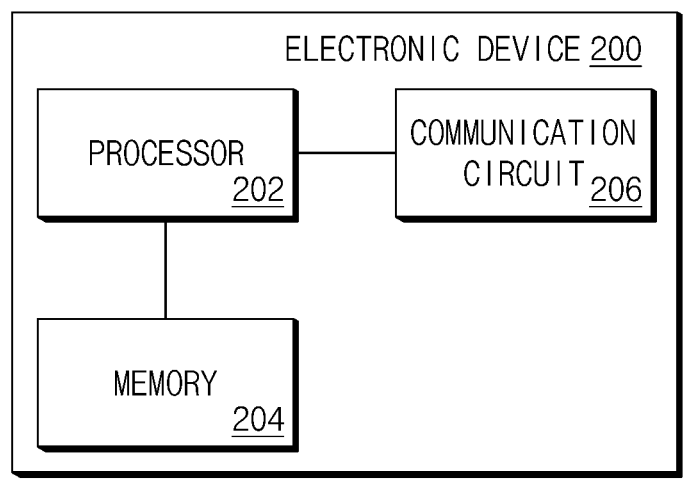
FIG. 2 is a block diagram illustrating a configuration of a server, according to an embodiment.

FIG. 2 is a block diagram illustrating a configuration of a server, according to an embodiment.

Referring to FIG. 2, a server 200 may include a processor 202, a memory 204, and a communication circuit 206. The configuration of the server 200 illustrated in FIG. 2 is an example and is variously changed to implement various embodiments disclosed in this specification. For example, the server 200 may include a configuration of the electronic device 1601 illustrated in FIG. 16, or may be appropriately changed or modified by using the configurations.

According to an embodiment, the processor 202 may execute instructions stored in the memory 204; the processor 202 may perform an operation according to various embodiments of the disclosure or may control any other components for the purpose of performing the operation. For example, the processor 202 may transmit or receive a signal with an electronic device (e.g., the electronic device 100 of FIG. 1) through the communication circuit 206, may process the signal received from the electronic device, and may store the processed result in the memory 204.

According to an embodiment, the processor 202 may include an application processor and/or a communication processor.

According to an embodiment, the memory 204 may store information generated by the processor 202 or information received from the electronic device. The memory 204 according to an embodiment may store instructions that cause the processor 202 to perform an operation according to an embodiment of the disclosure.

According to an embodiment, the communication circuit 206 may communicate with an external device (e.g., the electronic device 100 of FIG. 1) over a network. For example, the communication circuit 206 may communicate with a network by using wired communication or wireless communication associated with a specific profile. The wired communication or wireless communication service may be provided by an MNO.

According to an embodiment, the server 200 may transmit a profile to the electronic device 100. For example, the server 200 may be a subscriber management device such as a subscription manager-data preparation+(SM-DP+) server or a subscription manager discovery server (SM-DS) server. Alternatively, the server 200 may be, for example, a server performing at least part of operations associated with retransmission of an electronic device, such as a notification server to be described later.

Figure 3:
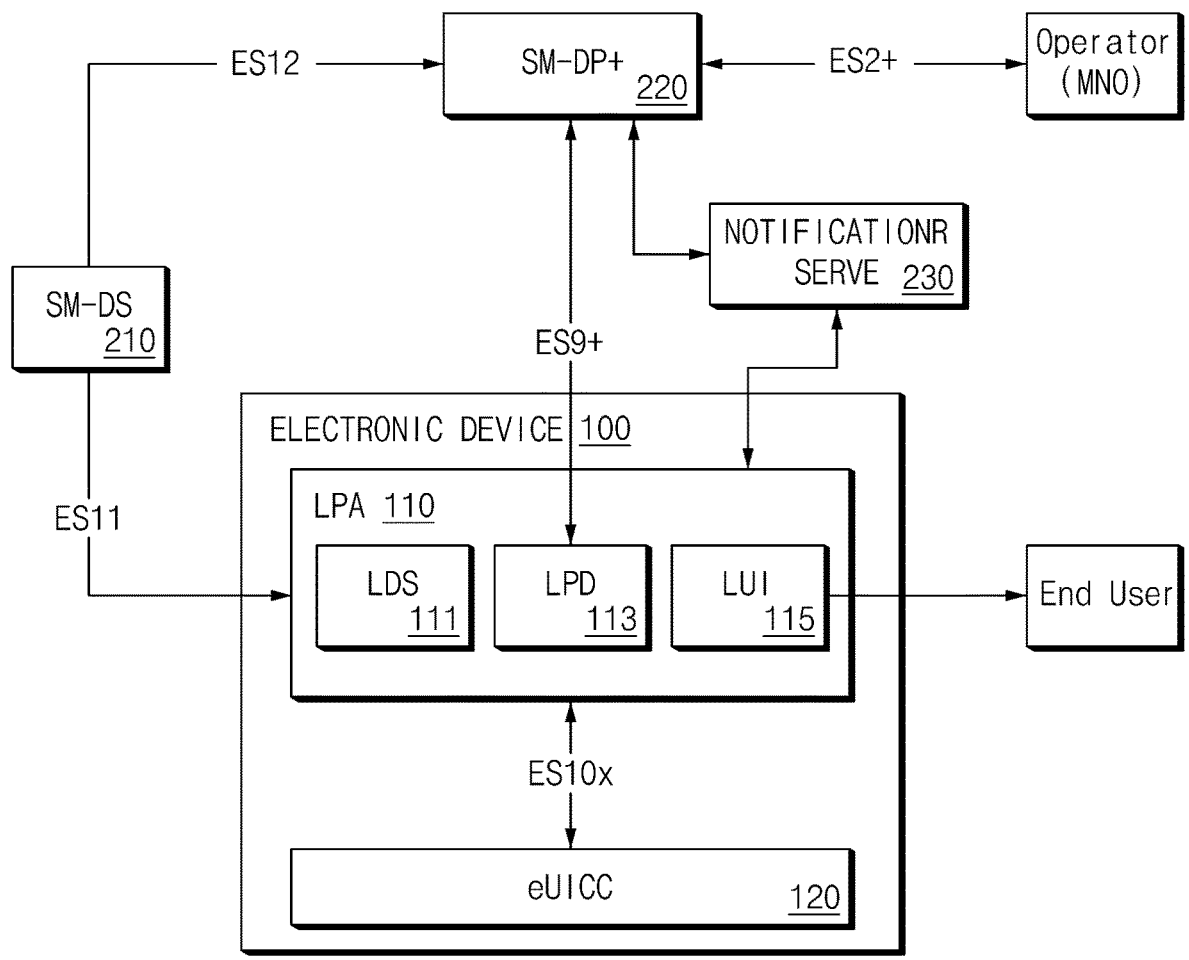
FIG. 3 illustrates a network architecture, in which an electronic device and a server operate, according to an embodiment.

FIG. 3 illustrates a network architecture, in which an electronic device and a server operate, according to an embodiment.

According to an embodiment, the electronic device 100 may include an eUICC 120 and may operate within a network environment defining the eUICC 120. For example, the electronic device 100 may operate in a network environment according to GSMA-related technical specifications.

According to an embodiment, the electronic device 100 (e.g., the electronic device 100 of FIG. 1) may communicate with an external server (e.g., an SM-DS server 210, an SM-DP+ server 220, or a notification server 230). According to various embodiments described in the specification, the electronic device 100 may perform an operation (e.g., profile management) associated with a profile and may transmit a result of performing an operation associated with the profile, to an external server.

According to an embodiment, the electronic device 100 may retrieve the event registered in the SM-DS server (the SM-DS 210); the electronic device 100 may download a profile (or a profile package) from the SM-DP+ server (the SM-DP+ 220). Each profile may correspond to an MNO (e.g., a telecommunications operator such as SKT, KT, or AT&T) or a communication service provided by the MNO.

According to an embodiment, the SM-DP+ server 220 may generate a profile and may deliver a profile package to a local profile assistant (LPA) 110 in the method having security. The profile package may include information associated with profile download. The LPA 110 may register an event to download the profile to the SM-DS server 210. The electronic device 100 may transmit a notification to the SM-DP+ server 220 and may obtain a response to the notification.

According to an embodiment, the SM-DS server 210 may transmit an event to trigger profile installation to the LPA 110. The event may include event identification (ID) and a server address; the LPA 110 may recognize the SM-DP+ server 220 capable of downloading a profile, based on the event ID and server address.

According to an embodiment, the MNO (or operator) may mean a communication operator; the MNO may request the SM-DP+ server 220 to prepare a profile. The profile requested by the MNO may be a profile corresponding to each MNO or a communication service provided by the MNO.

In addition, the description of the SM-DP+ server 220, the SM-DS server 210, or the MNO may refer to a GSMA-related technical specification document.

The electronic device 100 may include the LPA 110 and the eUICC 120 (e.g., the secure element 104 of FIG. 1) to download the profile and to receive the communication service associated with the MNO. Each configuration may be composed of software or hardware. According to an embodiment, the LPA 110 may be a software module implemented by a processor.

According to an embodiment, the LPA 110 may support the profile management of the eUICC 120. The LPA 110 may transmit a command or request for the profile management to the eUICC 120 and may process a response from the eUICC 120. The LPA 110 may include at least one of a local discovery service (LDS) 111, a local profile download (LPD) 113, or a local user interface (LUI) 115. Each module may be implemented with software or hardware, and may be operatively separated.

According to an embodiment, the LPA 110 may deliver a command or request for the profile management to the eUICC 120 and may process a response from the eUICC 120. For example, the profile management (or profile management operation) may include at least one of an operation of retrieving or modifying profile information, such as downloading a profile, installing a profile, enabling a profile, disabling a profile, deleting a profile, and listing a profile.

According to an embodiment, the LDS 111 may process an operation associated with subscription manager-discovery server (SM-DS). For example, the LDS 111 may process a discovery request for the eUICC 120. The LDS 111 may retrieve the event stored in the SM-DS server 210. The event stored in the SM-DS server 210 may include information for downloading a profile.

According to an embodiment, the LPD 113 may support an operation associated with profile download. The LPD 113 may communicate with the SM-DP+ server 220 and may download a profile package. The LPD 113 may support security transmission between the SM-DP+ server 220 and the LPA 110 to load a profile package.

The local user interface (LUI) 115 may support an operation associated with a user interface to interact with a user (end user in FIG. 3). The user may initiate a profile management operation through the LUI 115. The LUI 115 may obtain user intent associated with the profile management operation. For example, the user intent may be an operation such as profile enable or profile disable for the corresponding electronic device or an external electronic device.

Unlike the conventional UICC, the eUICC 120 may download a profile in an over-the-air (OTA) manner to use the mobile communication service of the MNO. A plurality of profiles may be included in the eUICC 120, and a user may select a profile through the LPA 110.

According to an embodiment, the eUICC 120 may store the profile and may perform an operation associated with the profile. For example, the eUICC 120 may obtain a message associated with a profile and may generate a response message as a response to the message. When enabling one profile, the eUICC 120 may implicitly disable the previously enabled profile.

The profile associated with a specific MNO may be stored in a secure domain of the eUICC 120. When the specific profile is enabled in the eUICC 120, the specific profile may be accessible to only an application or data, which is associated with the specific profile. Other profiles may fail to access the application or the data, which is associated with the specific profile.

According to an embodiment, various communication interfaces may be defined to communicate between respective configurations in the electronic device 100, between the electronic device 100 and servers on a network, or between servers. For example, information may be exchanged between the SM-DP+ server 220 and the SM-DS server 210 through an ES12 interface. The SM-DP+ server 220 and the MNO may exchange information through the ES2+ interface. The SM-DS server 210 may communicate with the electronic device 100 (or the LPA 110) through an ES11 interface. The SM-DP+ server 220 and the LPA 110 (or the LPD 113) may exchange signals through an ES9+ interface. The LPA 110 may exchange information with the eUICC 120 through an ES10x interface.

According to an embodiment, the electronic device 100 may transmit a notification associated with the profile to an external server (e.g., the SM-DP+ server 220) or the notification server 230, and may obtain a response from the corresponding server. When determining that transmission of the notification associated with the profile fails, the electronic device 100 may retransmit the notification associated with the profile to the external server or the notification server 230.

According to an embodiment, the notification server 230 may relay a notification retry associated with a profile between the electronic device 100 and an external server. For example, when obtaining the notification associated with the profile retried from the electronic device 100, the notification server 230 may deliver the notification to the external server.

Hereinafter, an example of a notification operation in the electronic device 100 will be described.

According to an embodiment, when the operation associated with the profile is successfully performed in the eUICC 120, the electronic device 100 may report the corresponding fact to the remote entity (recipient address). This procedure may be referred to as "transmitting, by an electronic device, a notification to the remote entity". In other words, the notification may be transmitted in response to an operation associated with the profile. For example, the remote entity may be an SM-DP+ server associated with a profile that becomes a target of the operation associated with the profile. Hereinafter, the remote entity is illustrated as an SM-DP+ server.

According to an embodiment, the notification may be generated by the eUICC 120; the notification may include at least one of a sequence number, a profile management operation, a recipient address, profile ID (e.g., integrated circuit card identification (ICCID)), or an eUICC signature.

According to an embodiment, there may be a single sequence number counter for the respective eUICC 120. When a new notification is added to a pending notification list, the sequence number may increase.

According to an embodiment, each profile may include notification configuration information. The notification configuration information may include at least one of a profile management operation or a recipient address.

According to an embodiment, when the profile management operation indicated by the notification configuration information is performed, the eUICC 120 may generate a notification and may put the notification in the notification list pending in the eUICC 120.

For example, as a profile management operation, when enabling of the profile is performed by the eUICC 120, the eUICC 120 may disable a profile that was previously enabled. In this case, notifications for each of disabling the profile and enabling the profile are generated by the eUICC 120, and the generated notifications may be provided to the pending notification list.

According to an embodiment, the LPA 110 may retrieve the notification list pending in the eUICC 120 and may transmit the notification. The LPA 110 may transmit the pending notification list to a recipient (e.g., the SM-DP+ server 220) that is in a connectable state.

According to an embodiment, when the LPA 110 obtains a positive response (acknowledgment) to the notification, the LPA 110 may allow the notification to be removed from the notification list pending in the eUICC 120.

According to an embodiment, the number of notifications in the pending notification list may be limited. When the number of notifications exceeds a limit, the eUICC 120 may remove the notification having the lowest sequence number.

According to an embodiment, the LPA 110 may group the notification for the respective SM-DP+ server 220. The LPA 110 may transmit the notification one by one depending on the sequence number. When transmitting a notification, the LPA 110 may first transmit the lowest sequence number. Here, the fact that the sequence number is the lowest may mean that the sequence number is a relatively old notification that has been generated. Then, a notification having the next sequence number may not be transmitted until the LPA 110 obtains a success or failure response to the previous notification from the SM-DP+ server 220.

Figure 4:
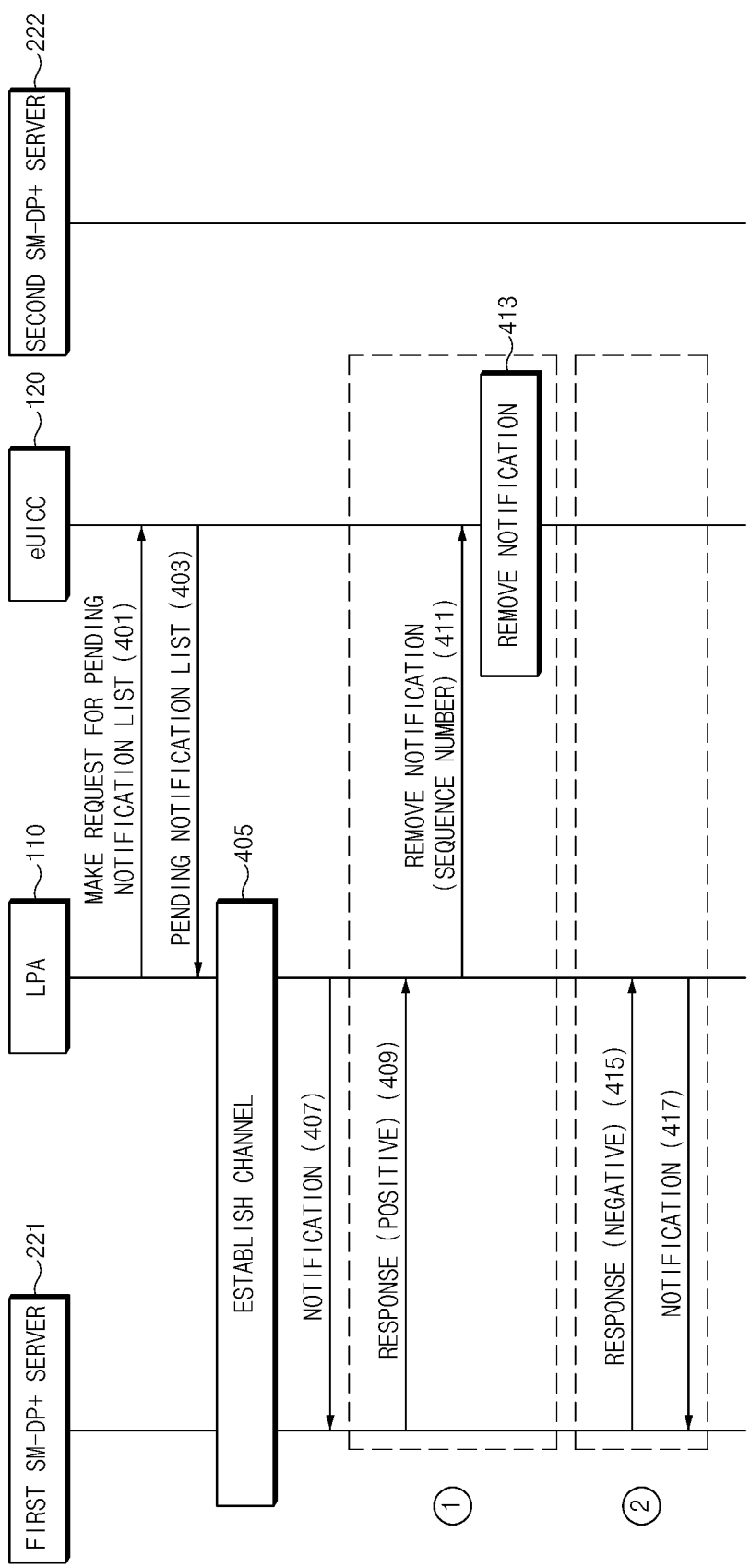
FIG. 4 illustrates a flow of an operation of transmitting a notification in an electronic device including an eUICC and a network including the electronic device, according to an embodiment.

FIG. 4 illustrates a flow of an operation of transmitting a notification in an electronic device including an eUICC and a network including the electronic device, according to an embodiment.

An operation illustrated in FIG. 4 may be performed by a first SM-DP+ server 221 (e.g., the server 200 in FIG. 2 or the SM-DP+ server 220 in FIG. 3), a second SM-DP+ server 222 (e.g., the server 200 in FIG. 2 or the SM-DP+ server 220 in FIG. 3), or an electronic device (e.g., the electronic device 100 in FIG. 1 or the electronic device 100 in FIG. 3). Each operation is stored in a memory (e.g., the memory 106 of FIG. 1 or the memory 204 of FIG. 2) in the form of instructions and may be executed by a processor. Some operations within the electronic device 100 may be performed by the LPA 110 (e.g., the LPA 110 in FIG. 3), or may be performed by the eUICC 120.

Referring to FIG. 4, the electronic device may transmit a notification to an SM-DP+ server (the first SM-DP+ server 221 in the case of FIG. 4) associated with a specific profile. The electronic device 100 may obtain a response message for the notification, and may retry (or retransmit) the transmission of the notification depending on information included in the response message. When the electronic device downloads the profile, the SM-DP+ server associated with the profile may be an SM-DP+ server providing the corresponding profile. Hereinafter, a transmission flow of a notification will be described with reference to FIG. 4. In addition, hereinafter, descriptions of operations performed in the internal configuration of the electronic device may be understood as descriptions of operations of the electronic device.

In operation 401, the LPA 110 may make a request for a pending notification list to the eUICC 120. For example, when the LPA 110 performs an operation associated with a profile, the LPA 110 may make a request for the pending notification list to the eUICC 120. For example, the actions associated with the profile may be an operation associated with profile management, such as profile download, profile installation, profile deletion, profile enable, or profile disable.

In operation 403, the eUICC 120 may transmit a pending notification list to the LPA 110 in response to the request.

In operation 405, the LPA 110 may establish a channel with the first SM-DP+ server 221. According to an embodiment, the channel may be a secure channel. For example, the establishment of the channel may be establishing a session. The LPA 110 may establish a transport layer security (TLS) session with the first SM-DP+ server 221. The LPA 110 may authenticate the first SM-DP+ server 221 while establishing the channel.

In operation 407, the LPA 110 may transmit a notification to the first SM-DP+ server 221. The notification may be a notification associated with a profile operation of the eUICC 120. For example, the profile operation may be a profile management operation. The notification may be a message indicating the successful execution of the profile management operation in the LPA 110 and/or the eUICC 120. For example, the notification may be a handle notification (handlenotification).

The LPA 110 may obtain a response to the notification from the first SM-DP+ server 221. According to the response, the operation of the LPA 110 may be divided into (1) and (2) of FIG. 4.

According to an embodiment, in operation 409, the LPA 110 may obtain a response from the first SM-DP+ server 221. The first SM-DP+ server 221 may deliver a response to the notification to the LPA 110. The response may be a success response (or a positive response). According to an embodiment, the response may include a status code. For example, the status code may be a hypertext transfer protocol (HTTP) status code (HTTP status code). The response may include a HTTP status code indicating a success. For example, the HTTP status code may be 200(ok) or 204(no content).

According to an embodiment, the HTTP status code may indicate the following information. '1xx' may indicate information; '2xx' may indicate a normal state. For example, '200(ok)' may indicate a normal request-response function execution state; '204(no content)' may indicate a normal notification function execution state. '3xx' indicates redirection; '4xx' indicates a HTTP client error; '5xx' indicates a HTTP server error. In addition, the HTTP status code may refer to the following table.

| Value | Description | Reference |
|---|---|---|
| 100 | Continue | [RFC7231, Section 6.2.1] |
| 101 | Switching Protocols | [RFC7231, Section 6.2.2] |
| 102 | Processing | [RFC2518] |
| 103-199 | Unassigned | |
| 200 | OK | [RFC7231, Section 6.3.1] |

-continued

| Value | Description | Reference |
|---|---|---|
| 201 | Created | [RFC7231, Section 6.3.2] |
| 202 | Accepted | [RFC7231, Section 6.3.3] |
| 203 | Non-Authoritative Information | [RFC7231, Section 6.3.4] |
| 204 | No Content | [RFC7231, Section 6.3.5] |
| 205 | Reset Content | [RFC7231, Section 6.3.6] |
| 206 | Partial Content | [RFC7233, Section 4.1] |
| 207 | Multi-Status | [RFC4918] |
| 208 | Already Reported | [RFC5842] |
| 209-225 | Unassigned | |
| 226 | IM Used | [RFC3229] |
| 227-299 | Unassigned | |
| 300 | Multiple Choices | [RFC7231, Section 6.4.1] |
| 301 | Moved Permanently | [RFC7231, Section 6.4.2] |
| 302 | Found | [RFC7231, Section 6.4.3] |
| 303 | See Other | [RFC7231, Section 6.4.4] |
| 304 | Not Modified | [RFC7232, Section 4.1] |
| 305 | Use Proxy | [RFC7231, Section 6.4.5] |
| 306 | (Unused) | [RFC7231, Section 6.4.6] |
| 307 | Temporary Redirect | [RFC7231, Section 6.4.7] |
| 308 | Permanent Redirect | [RFC7538] |
| 309-399 | Unassigned | |
| 400 | Bad Request | [RFC7231, Section 6.5.1] |
| 401 | Unauthorized | [RFC7235, Section 3.1] |
| 402 | Payment Required | [RFC7231, Section 6.5.2] |
| 403 | Forbidden | [RFC7231, Section 6.5.3] |
| 404 | Not Found | [RFC7231, Section 6.5.4] |
| 405 | Method Not Allowed | [RFC7231, Section 6.5.5] |
| 406 | Not Acceptable | [RFC7231, Section 6.5.6] |
| 407 | Proxy Authentication Required | [RFC7231, Section 3.2] |
| 408 | Request Timeout | [RFC7231, Section 6.5.7] |
| 409 | Conflict | [RFC7231, Section 6.5.8] |
| 410 | Gone | [RFC7231, Section 6.5.9] |
| 411 | Length Required | [RFC7231, Section 6.5.10] |
| 412 | Precondition Failed | [RFC7232, Section 4.2] [RFC8144, Section 3.2] |
| 413 | Payload Too Large | [RFC7231, Section 6.5.11] |
| 414 | URI Too Long | [RFC7231, Section 6.5.12] |
| 415 | Unsupported Media Type | [RFC7231, Section 6.5.13] [RFC7694, Section 3] |
| 416 | Range Not Satisfiable | [RFC7233, Section 4.4] |
| 417 | Expectation Failed | [RFC7231, Section 6.5.14] |
| 418-420 | Unassigned | |
| 421 | Misdirected Request | [RFC7540, Section 9.1.2] |
| 422 | Unprocessable Entity | [RFC4918] |
| 423 | Locked | [RFC4918] |
| 424 | Failed Dependency | [RFC4918] |
| 425 | Unassigned | |
| 426 | Upgrade Required | [RFC7231, Section 6.5.15] |
| 427 | Unassigned | |
| 428 | Precondition Required | [RFC6585] |
| 429 | Too Many Requests | [RFC6585] |
| 430 | Unassigned | |
| 431 | Request Header Fields Too Large | [RFC6585] |
| 432-450 | Unassigned | |
| 451 | Unavailable For Legal Reasons | [RFC7725] |
| 452-499 | Unassigned | |
| 500 | Internal Server Error | [RFC7231, Section 6.6.1] |
| 501 | Not Implemented | [RFC7231, Section 6.6.2] |
| 502 | Bad Gateway | [RFC7231, Section 6.6.3] |
| 503 | Service Unavailable | [RFC7231, Section 6.6.4] |
| 504 | Gateway Timeout | [RFC7231, Section 6.6.5] |
| 505 | HTTP Version Not Supported | [RFC7231, Section 6.6.6] |
| 506 | Variant Also Negotiates | [RFC2295] |
| 507 | Insufficient Storage | [RFC4918] |
| 508 | Loop Detected | [RFC5842] |
| 509 | Unassigned | |
| 510 | Not Extended | [RFC2774] |
| 511 | Network Authentication Required | [RFC6585] |
| 512-599 | Unassigned | |

In operation 411, the LPA 110 may remove the notification that transmission is successful, depending on the success response. The LPA 110 may deliver a notification removal message to the eUICC 120 to remove the notification. The notification removal message may be a message for instructing to remove the corresponding notification from the pending notification list. For example, the message may be 'removenotificationfromlist'. The notification removal message may include the sequence number. The sequence number may be the sequence number of a notification to be removed.

In operation 413, the eUICC 120 may remove the notification for the first SM-DP+ from storage in response to the notification removal message. The eUICC 120 may remove the notification corresponding to the sequence number.

Hereinafter, the operation of the electronic device will be described with reference to (2) when a response from the first SM-DP+ server 221 is not the success response.

In operation 415, the LPA 110 may obtain a response from the first SM-DP+ server 221. The first SM-DP+ server 221 may deliver a response to the notification to the LPA 110. The response may be a failure response (or negative response). According to an embodiment, the response may include a status code. For example, the response may include a HTTP status code. The response may include a HTTP status code indicating a failure. For example, the HTTP status code may be '4xx' or '5xx'. Here, 'xx' may be an integer of two digits.

In operation 417, the LPA 110 may retry a notification to the first SM-DP+ server 221 depending on the response obtained in operation 415. The LPA 110 may retry a notification in response to the failure response. When retrying the notification, the LPA 110 may retry a notification according to various embodiments below.

Figure 5:
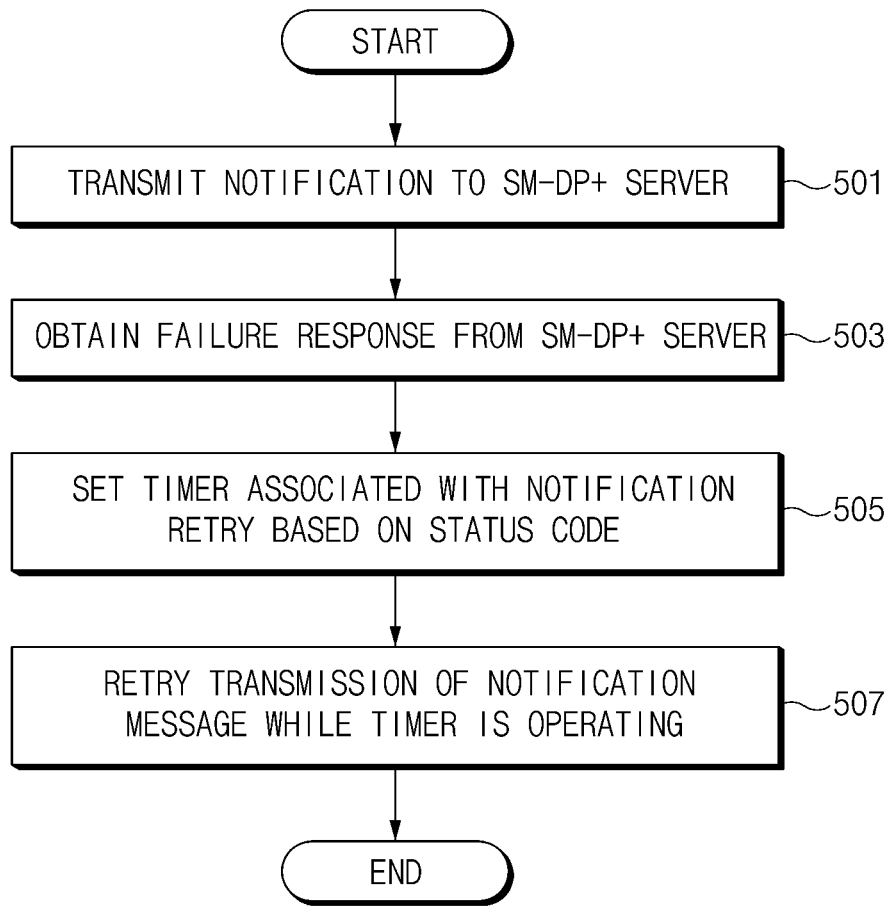
FIG. 5 is a flowchart of an operation, in which an electronic device retries a notification, according to an embodiment.

FIG. 5 is a flowchart of an operation, in which an electronic device retries a notification, according to an embodiment.

According to an embodiment, an electronic device (e.g., the electronic device 100 in FIG. 1 or the electronic device 100 in FIG. 3) may set a timer associated with the retry of the notification depending on the status code included in the response from the SM-DP+ server (e.g., the server 200 in FIG. 2 or the SM-DP+ server 220 in FIG. 3). The operation illustrated in FIG. 5 may be performed by an electronic device (e.g., the electronic device 100 in FIG. 1 or the electronic device 100 in FIG. 3). Each operation is stored in a memory (e.g., the memory 106 of FIG. 1 or the memory 204 of FIG. 2) in the form of instructions and may be executed by a processor. Some operations within the electronic device 100 may be performed by the LPA 110 (e.g., the LPA 110 in FIG. 3), or may be performed by the eUICC 120.

In operation 501, the electronic device may transmit a notification to the SM-DP+ server. Operation 501 may be the same as or similar to operation 407 of FIG. 4.

In operation 503, the electronic device may obtain a failure response from the SM-DP+ server. Operation 503 may be the same as or similar to operation 415 of FIG. 4.

In operation 505, the electronic device may set a timer associated with a notification retry based on the status code. According to an embodiment, the timer may be at least one. The status code may be included in the failure response. For example, the status code may be a HTTP status code.

In operation 507, the electronic device may retry a notification while the timer is operating. The electronic device may retry the notification to the SM-DP+ server. According to an embodiment, the electronic device may retry a notification until the success response is obtained while the timer is operating.

Figure 6:
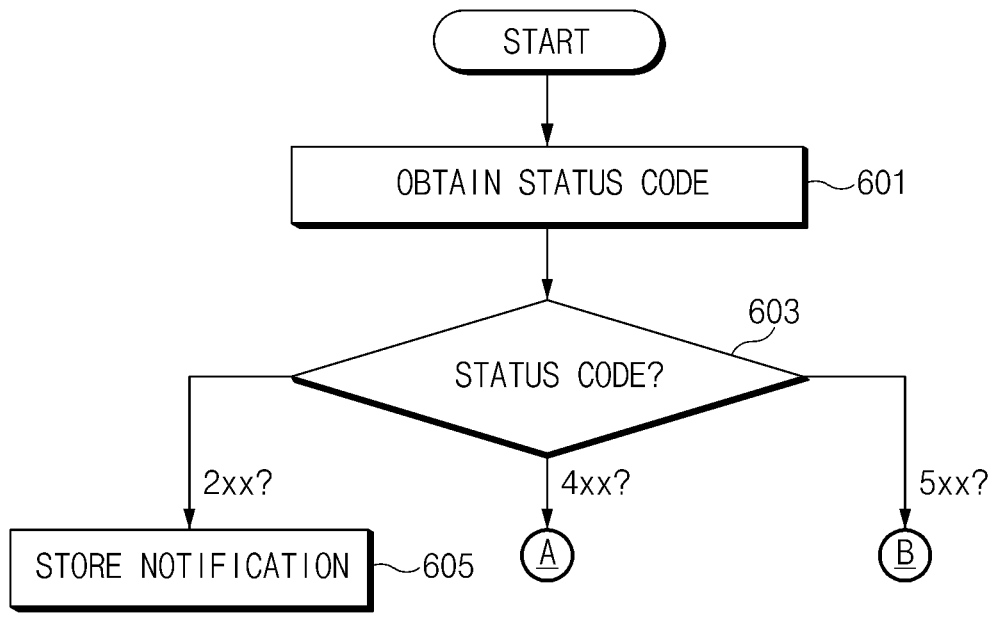
FIG. 6 illustrates an operation of an electronic device according to a response to a notification, according to an embodiment.
Figure 7:
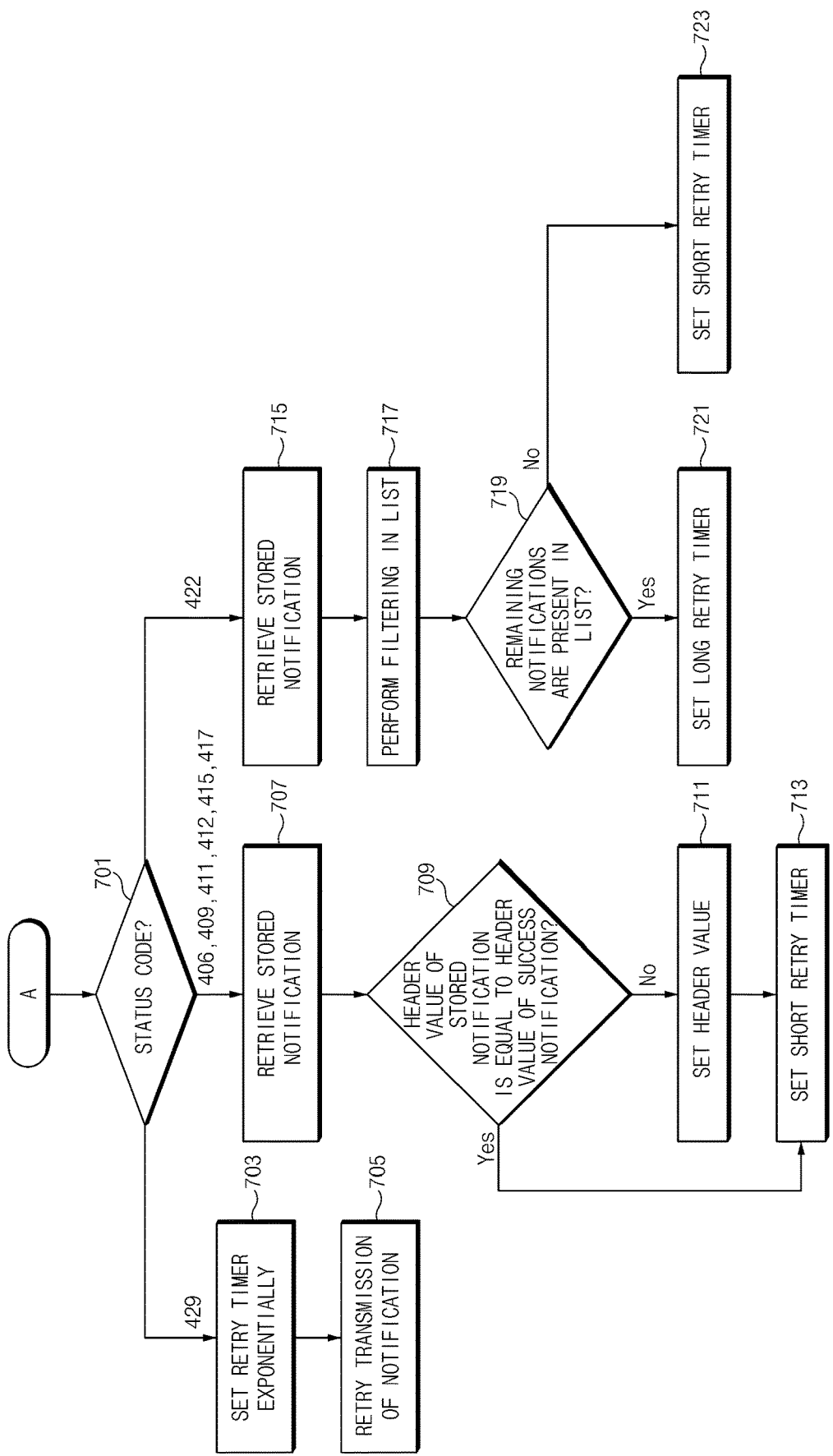
FIG. 7 illustrates an operation flow of an electronic device according to a status code, according to an embodiment.
Figure 8:
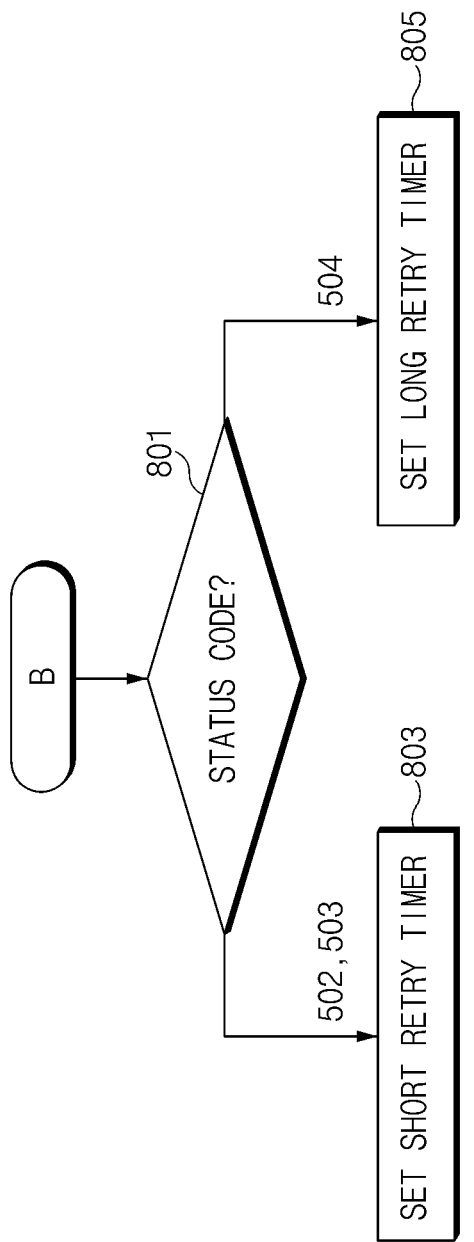
FIG. 8 illustrates an operation flow of an electronic device according to a status code, according to an embodiment.

FIGS. 6 to 8 illustrate an operation of an electronic device according to obtaining a response, according to an embodiment.

The operation illustrated in FIGS. 6 to 8 may be performed by an electronic device (e.g., the electronic device 100 in FIG. 1 or the electronic device 100 in FIG. 3). Each operation is stored in a memory (e.g., the memory 106 of FIG. 1 or the memory 204 of FIG. 2) in the form of instructions and may be executed by a processor. Some operations within the electronic device 100 may be performed by the LPA 110 (e.g., the LPA 110 in FIG. 3), or may be performed by the eUICC 120.

Referring to FIG. 6, the electronic device may store a notification or may set a timer associated with retransmission of the notification, depending on the status code included in a response. The electronic device may set the timer based on the status code.

In operation 601, the electronic device may obtain a status code. The status code may be included in the response received from the SM-DP+ server (e.g., the server 200 in FIG. 2, the SM-DP+ server 220 in FIG. 3, or the first SM-DP+ server 221 in FIG. 4).

In operation 603, the electronic device may identify the status code. When the status code is a code (e.g., 2xx) indicating first information, the electronic device may store a notification in operation 605. When the transmission status code is a code (hereinafter, 4xx) indicating second information, the electronic device may perform an operation of 'A' and operations after the operation of 'A' in FIG. 7; when the transmission status code is a code (hereinafter, 5xx) indicating third information, the electronic device may perform an operation of 'B' and operations after the operation of 'B' in FIG. 8.

FIG. 7 illustrates an operation flow of an electronic device when a transmission status code is a code indicating second information, according to an embodiment.

Referring to FIG. 7, when the status code is a code indicating second information in operation 601 of FIG. 6, an electronic device may retry transmission depending on the code. According to an embodiment, codes classified as codes indicating the second information may be at least one code indicating different reasons. The codes indicating the second information may be codes classified as '4xx'. For example, the code indicating the second information may be a HTTP status code of 406, 409, 411, 412, 415, 417, 429, or 422. For example, '4xx' may indicate a HTTP client failure; each code may indicate a reason for a failure. According to an embodiment, '429' may indicate "too many request"; '406' may indicate "not acceptable"; '409' may indicate "conflict"; '411' may indicate "length required"; '412' may indicate "precondition failed"; '415' may indicate "unsupported media type"; '417' may indicate "expectation failed"; '422' may indicate "unprocessable entry". The following example illustrates various operations of the electronic device according to the above-described codes. However, an embodiment is not limited to thereto. The following operations may also be performed on codes not mentioned. In addition, it is possible to modify the operation according to code.

According to an embodiment, in operation 701, the electronic device may identify a status code.

According to an embodiment, when the status code is the specified first code (e.g., 429) among the codes indicating the second information, in operation 703, the electronic device may set a retry timer value to an exponential value. In operation 705, the electronic device may retry the transmission of a notification while the retry timer is operating.

According to an embodiment, when the status code is a specified second code (e.g., 406, 409, 411, 412, 415, or 417) among codes indicating the second information, the electronic device may set a timer associated with the second code. For example, the timer associated with the second code may be a short retry timer. When setting the short retry timer, the electronic device may perform operation 707 to operation 713 to be described later. The short retry timer may be a timer set to a time shorter than the long retry timer.

According to an embodiment, in operation 707, the electronic device may retrieve the stored notification. The electronic device may compare the header value of the stored notification with the header value of the successful notification. The electronic device may determine whether the header value of the stored notification is the same as the header value of the successful notification; when the header value of the stored notification is the same as the header value of the successful notification, the electronic device may set the short retry timer in operation 713. When the header value of the stored notification is not the same as the header value of the successful notification, the electronic device may set a header value in operation 711 and then may set a short retry timer. Until the electronic device receives a success response while the short retry timer is operating, the electronic device may retry the notification transmission.

According to an embodiment, when the status code is a specified third code (e.g., 422) among codes indicating the second information, the electronic device may set a timer associated with the third code. The timer associated with the third code may be a long retry timer or a short retry timer. When setting the timer associated with the third code, the electronic device may perform operation 721 to operation 723 to be described later. The short retry timer may be a timer set to a time shorter than the long retry timer. When obtaining the third code, the electronic device may perform operation 715 and operations after operation 715.

According to an embodiment, in operation 715, the electronic device retrieves the stored notification list; in operation 717, the electronic device may perform filtering in the list. For example, the LPA of the electronic device may retrieve a notification list and may filter a notification in a list having the same notification address and/or the same event.

According to an embodiment, in operation 719, the electronic device may determine whether the remaining notifications are present in the list. When the remaining notifications are present, the electronic device may execute the long retry timer in operation 721; when the remaining notifications are not present, the electronic device may set the short retry timer in operation 723.

According to an embodiment, the electronic device may retry notification transmission depending on the timer set in operation 713, operation 721, or operation 723.

As such, the electronic device may set the timer depending on the status code, and may set the timer depending on the reason for the failure of the codes indicating the corresponding information, using another operation.

FIG. 8 illustrates an operation flow of an electronic device when a transmission status code is a code indicating third information, according to an embodiment.

Referring to FIG. 8, when the status code is a code indicating third information in operation 601 of FIG. 6, an electronic device may retry transmission depending on the code indicating the third information. The third information may be indicated by at least one code indicating different reasons. The third information may be codes classified as '5xx'. For example, the third information may be indicated by a HTTP status code that is 502, 503 or 504. For example, '5xx' may indicate a HTTP server failure; each code may indicate a reason for a failure. According to an embodiment, '502' may indicate a bad gateway; '503' may indicate "service unavailable": '504' may indicate "service timeout". The following example illustrates various operations of the electronic device according to the above-described codes. However, an embodiment is not limited to thereto. The following operations may also be performed on codes that are not mentioned, in addition, it is possible to modify the operation according to code.

According to an embodiment, in operation 801, the electronic device may identify a code indicating the third information. In the case of the first code (e.g., 502 or 503) among the codes indicating the third information, in operation 803, the electronic device may set a short retry timer; in the case of the second code (e.g., 504) among the codes indicating the third information, in operation 805, the electronic device may set a long retry timer.

Afterward, the electronic device may retry notification transmission until the electronic device obtains a success response from an SM-DP+ server while the set timer is operating.

Figure 9:
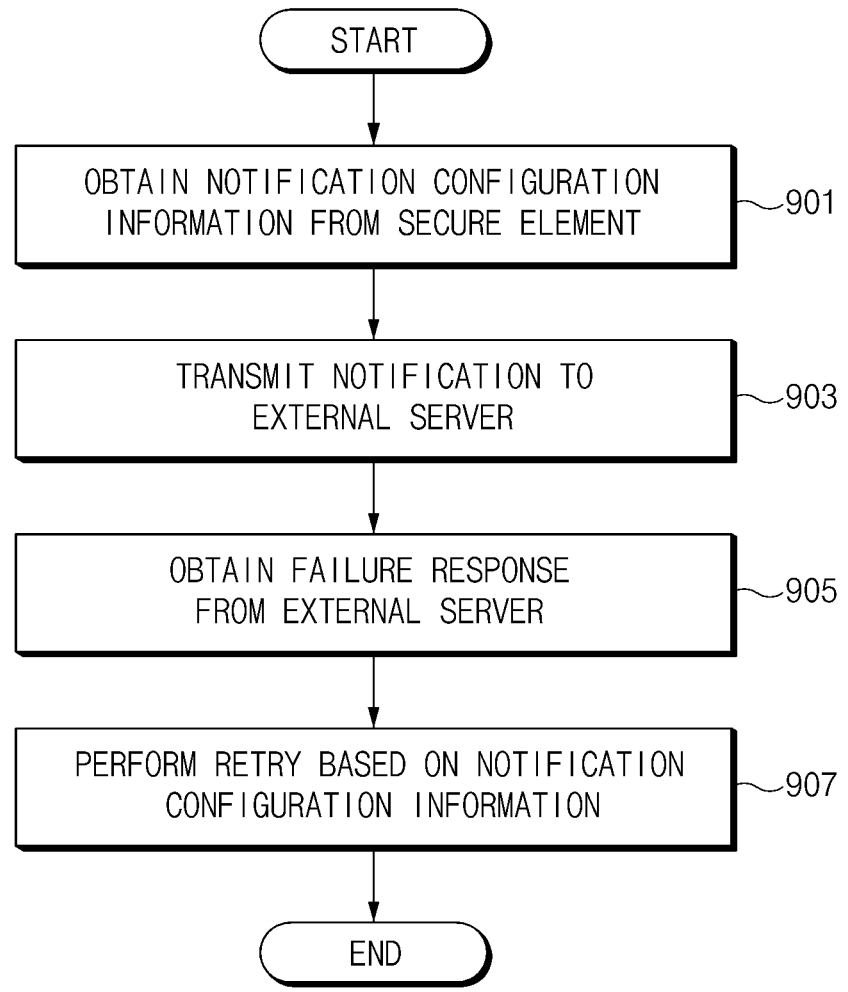
FIG. 9 is a flowchart of an operation, in which an electronic device retries a notification, according to an embodiment.

According to an embodiment, before obtaining a response to the notification transmitted to the SM-DP+ server, the electronic device (e.g., the electronic device 100 of FIG. 3) may obtain information associated with the retry of a notification from the eUICC (e.g., the eUICC 120 of FIG. 3); when obtaining a failure response as illustrated in operation 415 of FIG. 4, the electronic device may perform a notification operation (or a retry operation) depending on the information associated with the retry. Hereinafter, the operation of an electronic device will be described with reference to FIGS. 9 and 14.

The operation illustrated in FIGS. 9 to 12 may be performed by an electronic device (e.g., the electronic device 100 in FIG. 1 or the electronic device 100 in FIG. 3). Each operation is stored in a memory (e.g., the memory 106 of FIG. 1 or the memory 204 of FIG. 2) in the form of instructions and may be executed by a processor. Some operations within the electronic device 100 may be performed by the LPA 110 (e.g., the LPA 110 in FIG. 3), or may be performed by the eUICC 120.

According to an embodiment, in operation 901, the electronic device may obtain notification configuration information from a secure element. For example, the electronic device may obtain the information associated with the retry from the eUICC to the SM-DP+ server. For example, the electronic device may obtain the notification configuration information included in profile information. The profile information may be a list of profiles or may include the list of profiles. The list of the profiles may include the list of profiles pre-installed or previously downloaded and installed in the eUICC, and a state (or current state) of the corresponding profiles. For example, the profile information may include at least one of IDs of installed profiles (e.g., integrated circuit card identification (ICCID)), a profile status, a profile nickname, a service provider name, a profile name, a profile class, notification configuration information (notification configuration info), a profile owner, SM-DP+ proprietary data, or profile policy rules.

According to an embodiment, the notification configuration information may include information associated with the retry. The information associated with the retry may be included in profile information delivered by the eUICC to the LPA. According to an embodiment, the profile information may include the notification configuration information. According to an embodiment, the notification configuration may include fields including information such as profile owner information (e.g., operator ID), a profile operating policy (e.g., profile policy rules), or asset data (e.g., proprietary data). According to an embodiment, the notification configuration information may further include a field including the information associated with the retry. The information field associated with the retry may include at least one of an information field (maxretrycount) associated with a retry count, an information field (retrytimer) associated with a retry timer, or an information field (or a removal timer (removetimer)) associated with a deletion timer (deletetimer).

According to an embodiment, the information associated with the retry count may indicate the maximum retry count of a notification. The information associated with the retry count may be expressed as a specific value (e.g., integer). When the retry count reaches the maximum retry count depending on the information associated with the retry count, the electronic device may delete the notification that is the target of the retry. Hereinafter, the operation of an electronic device associated with the retry count will be described in detail with reference to FIG. 10.

According to an embodiment, the information associated with the retry timer may indicate a timer value (e.g., integer) for retrying notification transmission when a response not including '2xx' is obtained from the SM-DP+ server. When the set time elapses depending on information associated with a retry timer, the electronic device may transmit the corresponding notification. Hereinafter, the operation of the electronic device will be described in detail with reference to FIG. 11.

According to an embodiment, the information associated with the deletion timer may indicate a timer value (e.g., integer) for deleting a notification after the notification is generated. After the notification is generated, when the notification is not processed even when the time corresponding to the corresponding timer has elapsed, the electronic device may delete the corresponding notification. For example, when the electronic device obtains a success response after transmitting a notification, even when the timer has not elapsed, the electronic device may delete the notification. However, when a notification is not processed within a specific time, the electronic device may delete the notification such that the notification is not retried continuously when the electronic device continuously obtains a failure response after the notification is transmitted. Hereinafter, the operation of the electronic device associated with the deletion timer will be described in detail with reference to FIG. 12.

According to an embodiment, in operation 903, the electronic device may transmit a notification to an external server. The notification may be a notification associated with a profile. For example, the notification may be a handle notification.

According to an embodiment, in operation 905, a failure response may be obtained from the external server. For example, the failure response may be a response including a code of which a status code is '4xx' or '5xx'.

According to an embodiment, the external server may be an SM-DP+ server.

According to an embodiment, in operation 907, the electronic device may retry notification transmission based on the notification configuration information. The electronic device may retry the notification transmission based on the information associated with the retry. The information associated with the retry may include at least one of information associated with a retry timer, information associated with a deletion timer, or information associated with a retry count.

Figure 10:
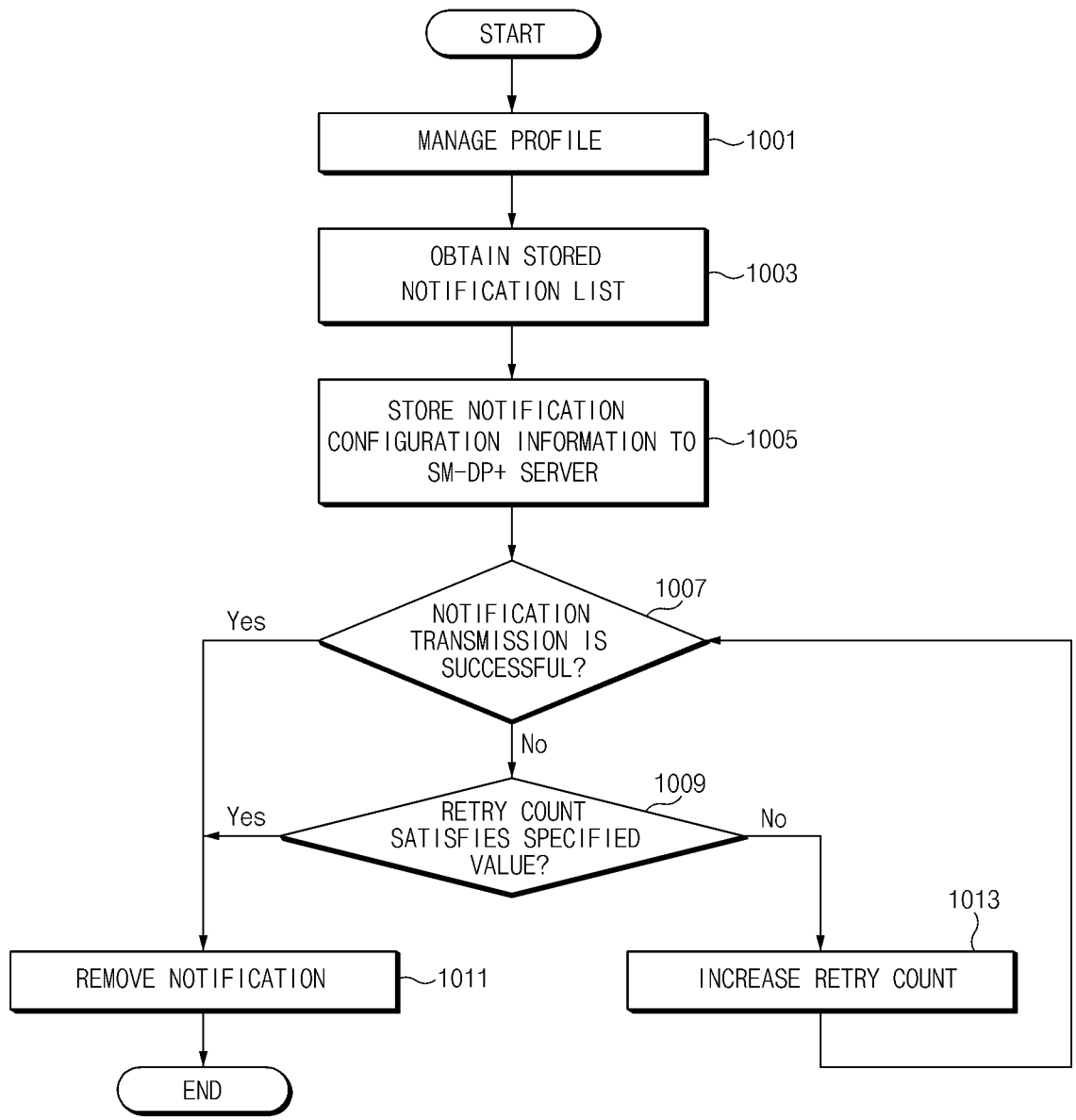
FIG. 10 is a flowchart of an operation, in which an electronic device retries a notification, according to an embodiment.

FIG. 10 is a flowchart of a retry operation of an electronic device according to information associated with a retry, according to an embodiment.

According to an embodiment, an electronic device may obtain information associated with the retry count, and may perform the notification transmission depending on the corresponding information.

According to an embodiment, in operation 1001, the electronic device may perform profile management. For example, the profile management may be downloading, installing, enabling, or disabling a profile, or deleting a profile.

According to an embodiment, in operation 1003, the electronic device may retrieve a stored notification list. For example, the LPA (e.g., the LPA 110 in FIG. 4) of the electronic device may make a request for a pending notification list to an eUICC (e.g., the eUICC 120 in FIG. 4) and may obtain a notification list from the eUICC.

According to an embodiment, in operation 1005, the electronic device may store information associated with the retry to the SM-DP+ server. According to an embodiment, the information associated with the retry may include a value associated with a retry count.

According to an embodiment, in operation 1007, the electronic device may determine whether the notification transmission to SM-DP+ has been successful. For example, the electronic device may determine whether the response to the notification is a success response or a failure response, or whether the response to the notification includes a specified code, after the notification transmission to the SM-DP+. When the notification transmission fails, the electronic device may perform operation 1009 and operations after operation 1009; when the notification transmission is successful, the electronic device may perform operation 1011.

According to an embodiment, in operation 1009, the electronic device may determine whether the retry count satisfies the specified value. For example, the electronic device may determine whether the retry count has reached the maximum retry count depending on the information associated with the retry count obtained in operation 901 of FIG. 9.

According to an embodiment, when the retry count satisfies the maximum retry count, the electronic device may perform notification removal in operation 1011. For example, when the retry count is equal to the maximum retry count, the electronic device may perform notification removal in operation 1011.

According to an embodiment, when the retry count does not satisfy the maximum retry count (alternatively, while the retry count is less than the maximum retry count), the electronic device may increase the retry count in operation 1013, and may again perform operation 1007 and operations after operation 1007.

According to an embodiment, when the electronic device determines that the notification transmission is successful, in operation 1011, the electronic device may remove the notification. The notification removal may refer to the description of operation 413 of FIG. 4.

Figure 11:
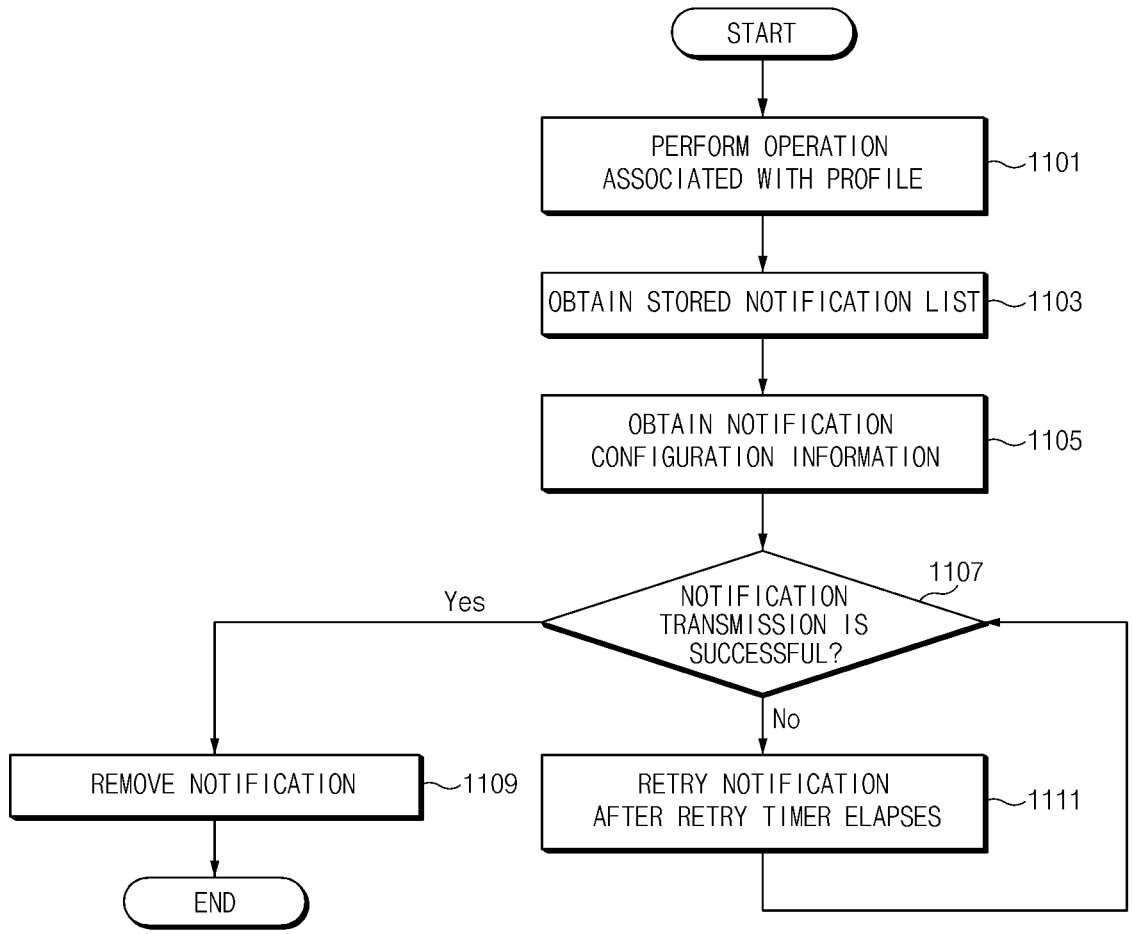
FIG. 11 is a flowchart of an operation, in which an electronic device retries a notification, according to an embodiment.

FIG. 11 is a flowchart of a retry operation of an electronic device according to information associated with a retry, according to an embodiment.

According to an embodiment, an electronic device may perform an operation (e.g., profile management) associated with a profile; after performing the operation associated with the profile, the electronic device may perform a notification to the SM-DP+ server. When the notification is not successful, the notification may be retried. Upon retrying the notification, the electronic device may retry the notification based on notification configuration information obtained before performing the notification. According to an embodiment, the notification configuration information may include information associated with a retry timer. When the notification transmission is not successful depending on the configuration information, the electronic device may retry a notification transmission after the retry timer has elapsed.

According to an embodiment, in operation 1101, the electronic device may perform profile management. For example, the profile management may be an operation such as installing a profile, downloading a profile, enabling a profile, or deleting a profile.

According to an embodiment, in operation 1103, the electronic device may obtain a stored notification list. For example, the electronic device may obtain a notification list pending in the eUICC.

According to an embodiment, in operation 1105, the electronic device may obtain the notification configuration information. The notification configuration information may include information associated with a notification retry of the electronic device. For example, the notification configuration information may include the information associated with the retry timer.

According to an embodiment, in operation 1107, the electronic device may determine whether the notification transmission has been successful. The electronic device may transmit a notification to the SM-DP+ server, and may obtain a response from the SM-DP+ server in response thereto. The response may include a code indicating whether the notification transmission has been successful. For example, the code may include an HTTP status code; the electronic device may determine whether the notification transmission is successful, through a HTTP status code.

According to an embodiment, when the electronic device determines that the notification transmission is successful, in operation 1109, the electronic device may remove the notification. The notification removal may refer to the description of operation 413 of FIG. 4.

According to an embodiment, when the electronic device determines that the notification transmission fails, in operation 1111, the electronic device may retry a notification after the retry timer has elapsed. The electronic device may operate the retry timer in response to the failure of the notification transmission; the electronic device may not perform a notification retry in a section where the retry timer operates; when the time corresponding to the retry timer value has elapsed (or when the retry timer expires), the electronic device may perform a notification retry. To this end, the electronic device may set the retry timer depending on the notification configuration information.

According to an embodiment, after the retry timer has elapsed, in operation 1107, the electronic device may perform an operation of determining whether the notification transmission is successful. Operation 1111 and operation 1107 may be repeatedly performed until the notification transmission is successful.

Figure 12:
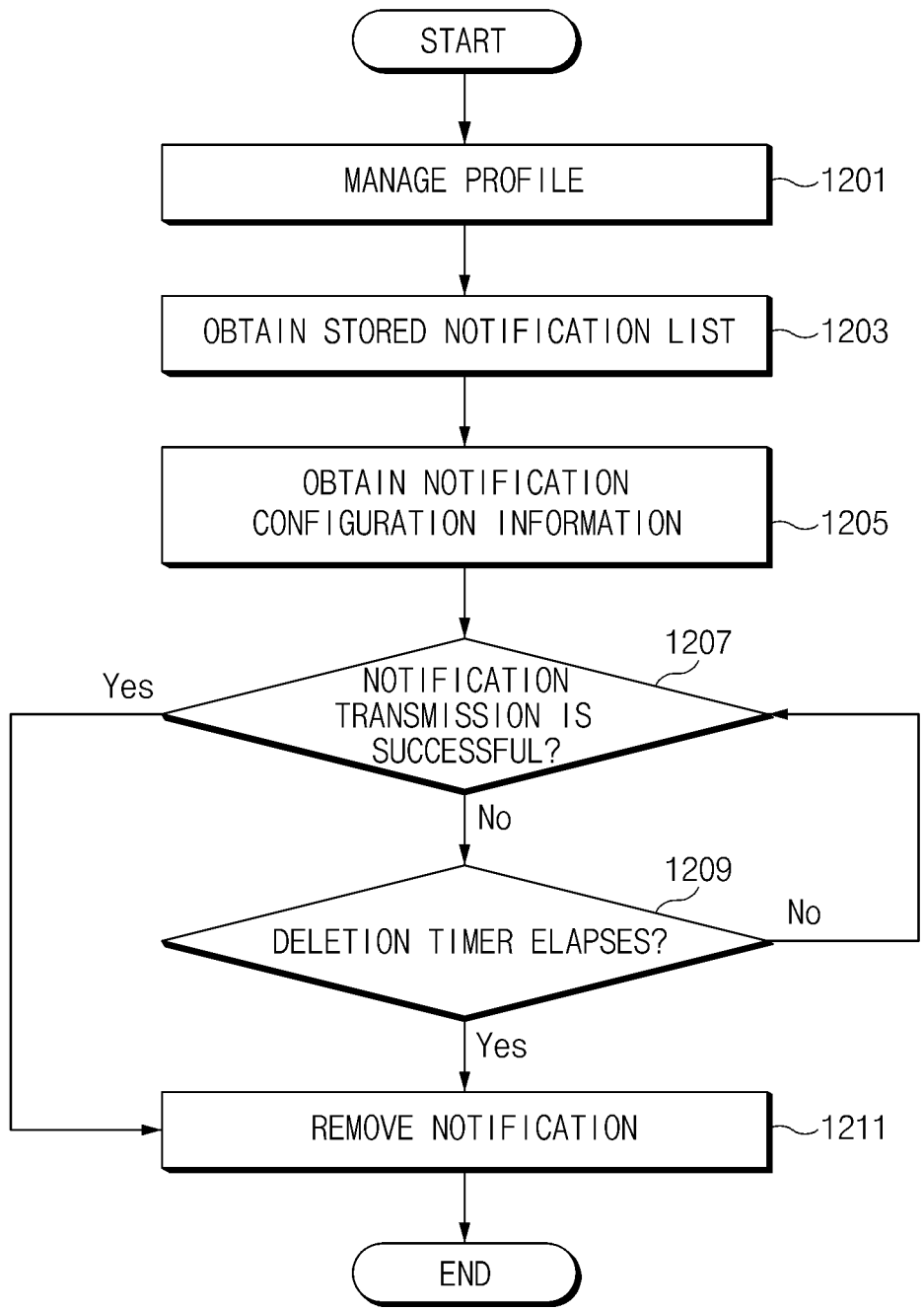
FIG. 12 is a flowchart of an operation, in which an electronic device retries a notification, according to an embodiment.

FIG. 12 is a flowchart of a retry operation of an electronic device according to information associated with a retry, according to an embodiment.

According to an embodiment, the electronic device may retry a notification based on notification configuration information. According to an embodiment, the notification configuration information may include information associated with a deletion timer (or a removal timer). When the notification transmission is not successful depending on the configuration information, after deletion timer has elapsed after a notification is generated, the electronic device may delete (or remove) the notification.

According to an embodiment, in operation 1201, the electronic device may perform profile management. For example, when the LPA of the electronic device issues a command to the eUICC so as to enable a profile, the eUICC may enable the profile depending on the command.

According to an embodiment, in operation 1203, the electronic device may obtain a stored notification list. The electronic device may obtain a notification list stored in the eUICC, in response to the profile management operation.

According to an embodiment, in operation 1205, the electronic device may obtain the notification configuration information. The electronic device may obtain and store the notification configuration information. For example, the notification configuration information may include information associated with the deletion timer.

According to an embodiment, in operation 1207, the electronic device may determine whether the notification transmission has been successful. Operation 1207 may be the same as or similar to operation 1107 of FIG. 11.

According to an embodiment, when the electronic device determines that the notification transmission is successful, in operation 1211, the electronic device may remove the notification. The notification removal may refer to the description of operation 413 of FIG. 4.

According to an embodiment, when the electronic device determines that the notification transmission fails, in operation 1209, the electronic device may determine whether the deletion timer has elapsed. In other words, the electronic device may operate the deletion timer and may determine whether the deletion timer has elapsed, in response to the generation of the notification. To this end, the electronic device may generate the notification in response to an operation associated with the profile. When the deletion timer has not elapsed (or while the deletion timer is in operation), the electronic device may perform operation 1207. In other words, the electronic device may retry the notification transmission until the time corresponding to the deletion timer value has elapsed. When the deletion timer has elapsed, in operation 1211, the electronic device may remove the notification.

Figure 13:
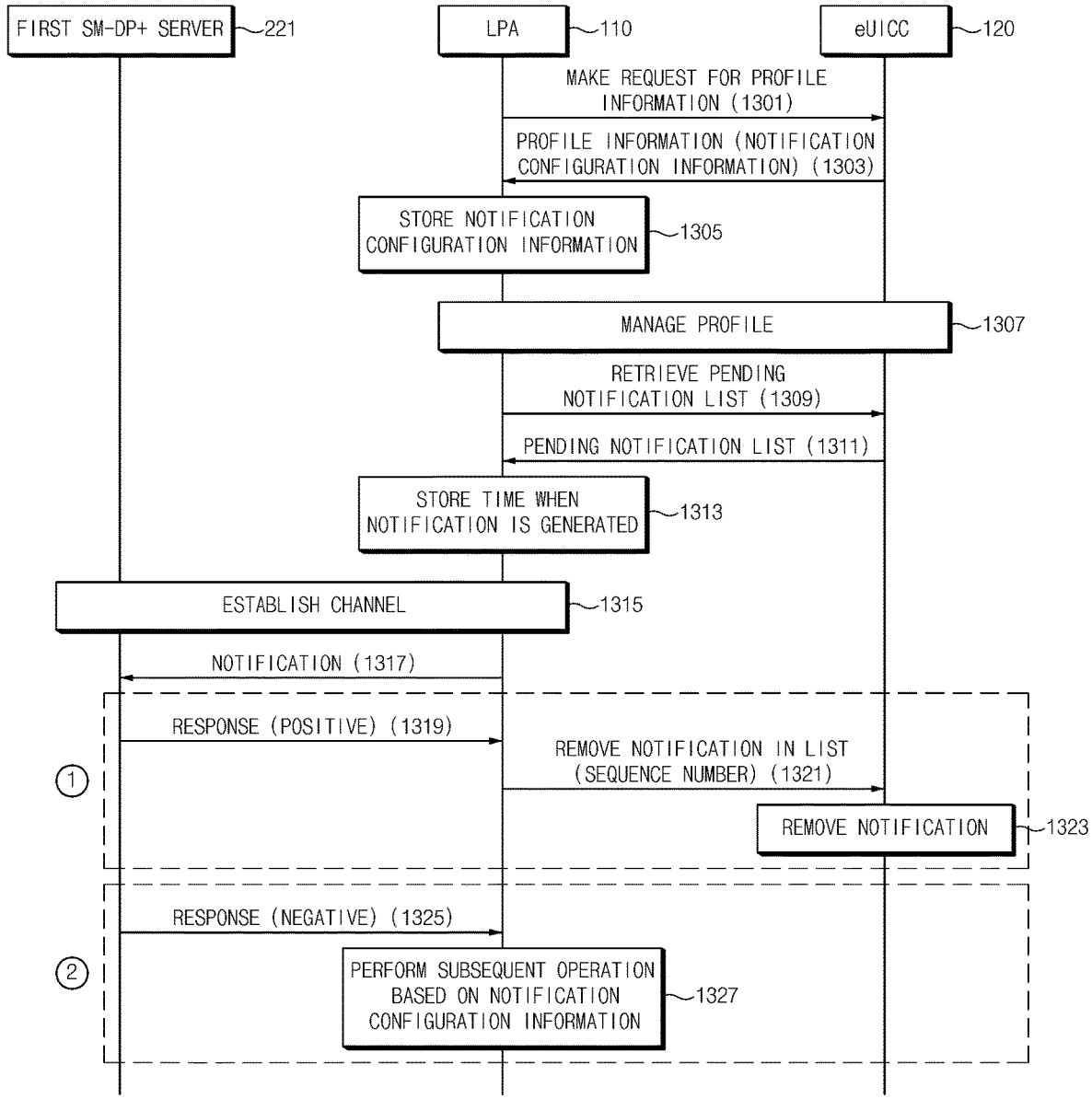
FIG. 13 illustrates a flow of an operation of transmitting a notification performed in an electronic device including an eUICC and a network including the electronic device, according to an embodiment.

FIG. 13 illustrates a flow of an operation of transmitting a notification in an electronic device including an eUICC and a network including the electronic device, according to an embodiment.

An operation illustrated in FIG. 13 may be performed by the first SM-DP+ server 221 (e.g., the server 200 in FIG. 2 or the SM-DP+ server 220 in FIG. 3) or an electronic device (e.g., the electronic device 100 in FIG. 1 or the electronic device 100 in FIG. 3). Each operation is stored in a memory (e.g., the memory 106 of FIG. 1 or the memory 204 of FIG. 2) in the form of instructions and may be executed by a processor. Hereinafter, the operation of the electronic device is described as operations of the LPA 110 and the eUICC 120, but each of the operations may be understood as an operation of the electronic device.

According to an embodiment, the LPA 110 may obtain profile information including notification configuration information from the eUICC 120; the LPA 110 may perform notification retransmission to the SM-DP+ server 221 based on the notification configuration information.

According to an embodiment, in operation 1301, the LPA 110 may make a request for profile information to the eUICC 120. The profile information request may be a profile list request. The profile information request may correspond to 'GetProfileInfo' in the GSMA standard specifications.

According to an embodiment, in operation 1303, the LPA 110 may obtain the profile information in response to the request; in operation 1305, the LPA 110 may store the notification configuration information. The profile information may include the notification configuration information. The profile information may be a list of profiles. The notification configuration information may include at least one of information associated with a retry count, information associated with a retry timer, or information associated with a deletion timer.

According to an embodiment, in operation 1307, the LPA 110 and the eUICC 120 may perform profile management. For example, the profile management may be downloading, installing, enabling, or disabling a profile, or deleting a profile. The LPA 110 may request or instruct the eUICC 120 to manage a profile; the eUICC 120 may transmit the result of performing profile management to the LPA 110 after performing the profile management in response to the request or command.

According to an embodiment, in operation 1309, the LPA 110 may retrieve a pending notification list in the eUICC 120. Operation 1309 may be the same as or similar to operation 401 of FIG. 4. For example, the LPA 110 may make a request for the pending notification list to the eUICC 120 after performing the profile management on a profile (or in response to the result of performing the profile).

According to an embodiment, in operation 1311, the eUICC 120 may transmit the pending notification list to the LPA 110 in response to the request.

According to an embodiment, in operation 1313, the LPA 110 may store a time when a notification is generated. To this end, the LPA 110 may obtain a time when a specific notification is generated in the eUICC 120. The notification may be generated after a secure element performs an operation associated with a profile.

According to an embodiment, in operation 1315, the LPA 110 may establish a channel with the SM-DP+ server 221. According to an embodiment, the channel may be a secure channel. For example, the establishment of the channel may be establishing a session. The session may be a TLS session. The LPA 110 may authenticate the SM-DP+ server 221 during the channel establishment process.

According to an embodiment, in operation 1317, the LPA 110 may transmit a notification to the SM-DP+ server 221.

According to an embodiment, the LPA 110 may obtain a response from the SM-DP+ server 221 in response to the notification. The operations of the LPA 110 may be divided into (1) and (2) of FIG. 13 depending on the response. (1) indicates the operation of the electronic device when a success response is obtained; (2) indicates the operation of the electronic device when a failure response is obtained.

According to an embodiment, in operation 1319, the LPA 110 may obtain a success response from the SM-DP+ server 221. In operation 1321, the LPA 110 may request or instruct the eUICC 120 to remove a notification in response to the success response; in operation 1323, the eUICC 120 may perform notification removal in response to the request or command. Operation 1319, operation 1321, or operation 1323 may refer to the description of operations 409 to operation 413 in FIG. 4.

According to an embodiment, in operation 1325, the LPA 110 may obtain a failure response from the SM-DP+ server 221. In operation 1327, the LPA 110 may perform the subsequent operation based on the notification configuration information, in response to the failure response. The LPA 110 may perform the subsequent operation based on the notification configuration information stored in operation 1305. For example, the LPA 110 may perform notification retry depending on information associated with a retry count; alternatively, the LPA 110 may retransmit a notification when a retry timer elapses depending on information associated with the retry timer; alternatively, the LPA 110 may remove the corresponding notification when the deletion timer elapses depending on information associated with the deletion timer. When the notification is removed, the LPA 110 may perform operates the same as operation 1321 and operation 1323.

Figure 14:
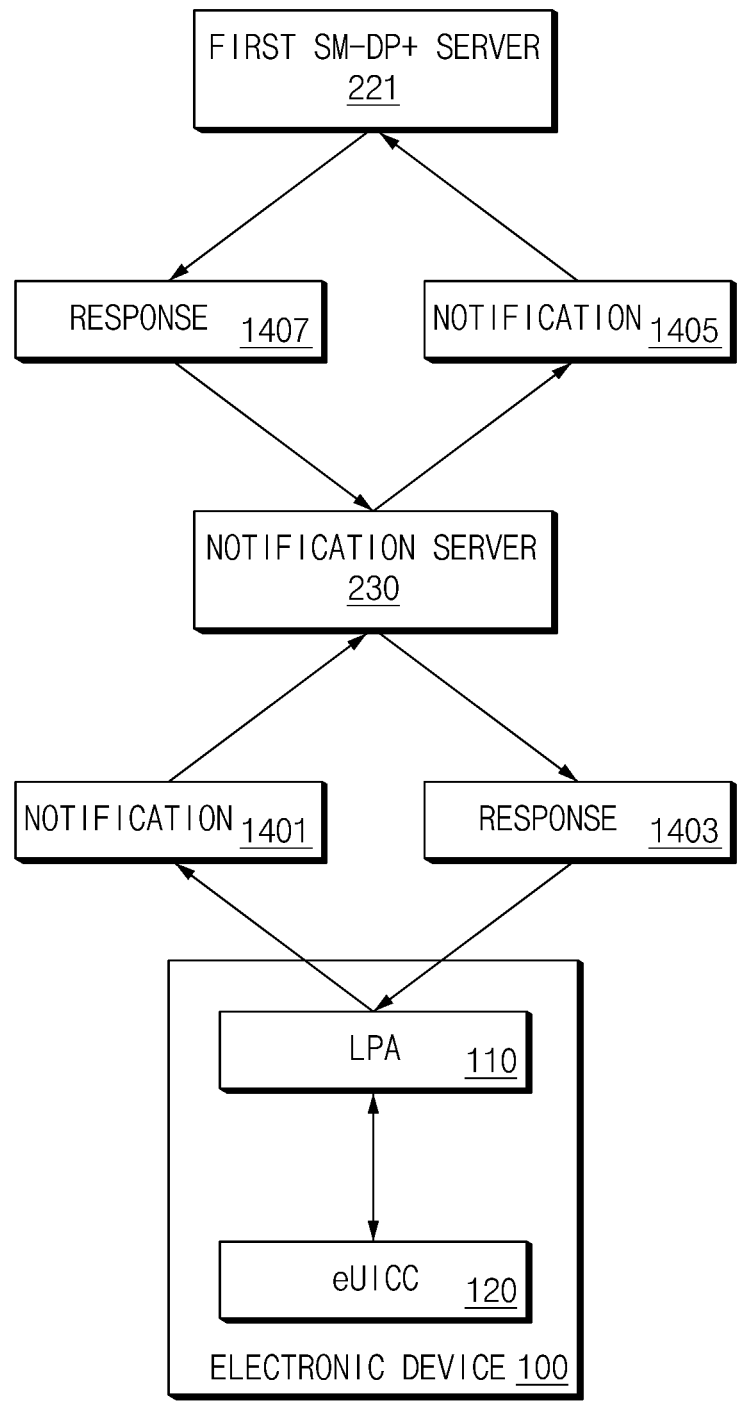
FIG. 14 illustrates an operation flow, in which a notification server relays a notification of an electronic device to an SM-DP+ server, according to an embodiment.

FIG. 14 illustrates an operation flow, in which a notification server relays a notification operation of an electronic device to an SM-DP+ server, according to an embodiment.

Referring to FIG. 14, when a reason that the electronic device 100 performs a notification occurs, the electronic device 100 (e.g., the electronic device 100 of FIG. 1 or 3) may transmit the notification to the notification server 230 (e.g., the server 200 in FIG. 2 or the notification server 230 in FIG. 3), and the notification server 230 may perform a notification procedure with the SM-DP+ server 221 (e.g., the server 200 in FIG. 2 or the SM-DP+ server 220 in FIG. 3) instead of the electronic device 100. For example, when the notification server 230 obtains a notification from the electronic device 100, the notification server 230 may transmit the notification to the SM-DP+ server 221, and the notification server 230 may retransmit the notification to the SM-DP+ server 221 as needed.

In addition, according to various embodiments disclosed in the specification, the notification server 230 may perform an operation the same as or similar to the notification operation and notification retransmission operation of the electronic device 100.

According to an embodiment, in operation 1401, the electronic device 100 may transmit a notification to the notification server 230. For example, the LPA 110 may perform a profile management operation and may transmit a notification to the notification server 230 in response to the profile management result.

According to an embodiment, in operation 1403, the notification server 230 may transmit a response to the notification to the electronic device 100. The electronic device 100 may obtain the response and may remove the corresponding notification from the notification list in the eUICC 120.

According to an embodiment, in operation 1405, the notification server 230 may transmit a notification to the SM-DP+ server 221. The notification operation of the notification server 230 may refer to the description of operation 407 of FIG. 4 or operation 1317 of FIG. 13.

According to an embodiment, in operation 1407, the notification server 230 may obtain a response from the SM-DP+ server 221. The response may be a success response or failure response.

According to an embodiment, when the success response is received from the SM-DP+ server 221, the notification server 230 may delete the corresponding notification.

According to an embodiment, the notification server 230 may receive the failure response from the SM-DP+ server 221. When receiving the failure response, the notification server 230 may perform notification retransmission.

According to an embodiment, the notification server 230 may retransmit the notification to the SM-DP+ server 221 in response to receiving the failure response until a success response is obtained.

According to an embodiment, the notification server 230 may perform a notification retransmission operation of the electronic device 100 disclosed in FIGS. 5 to 13. For example, the notification server 230 may perform notification retransmission depending on the HTTP status code included in the response from the SM-DP+ server.

Figure 15:
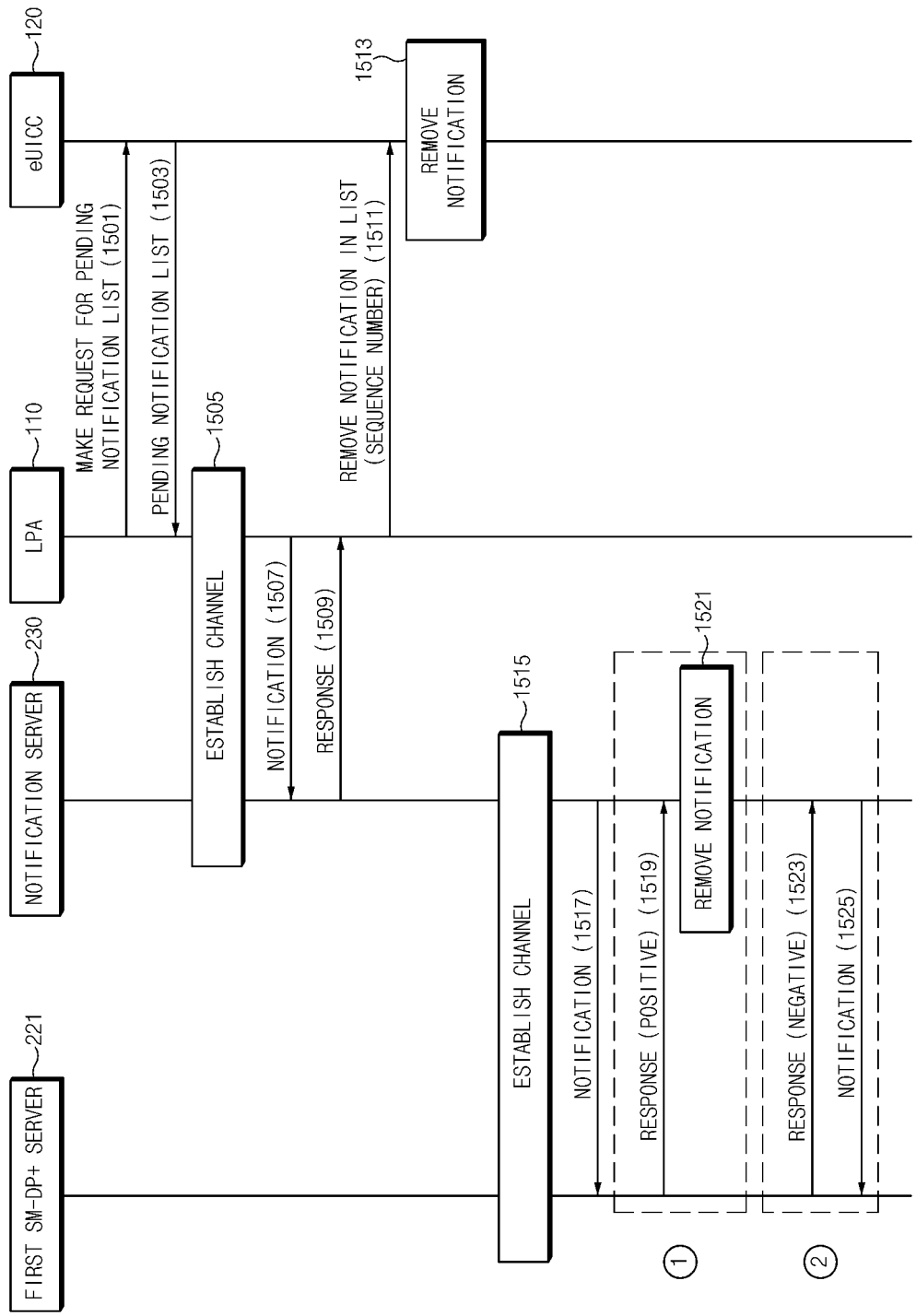
FIG. 15 is a flowchart of a notification retry operation, according to an embodiment.

FIG. 15 is a flowchart of a notification retransmission operation, according to an embodiment.

Referring to FIG. 15, the notification server 230 (e.g., the server 200 in FIG. 2 or the notification server 230 in FIG. 3) may transmit a notification obtained from the electronic device 100 (e.g., the electronic device 100 in FIG. 1 or the electronic device 100 in FIG. 3) to the SM-DP+ server 221 (e.g., the server 200 in FIG. 2 or the SM-DP+ server 220 in FIG. 3), and then may retransmit the notification to the SM-DP+ server 221 or may remove the notification, depending on the response obtained from the SM-DP+ server 221.

According to an embodiment, in operation 1501, the LPA 110 may make a request for a pending notification list to the eUICC 120. In operation 1503, the LPA 110 may obtain a pending notification list from the eUICC 120.

According to an embodiment, in operation 1505, the LPA 110 may establish a channel with the notification server 230. The channel may be a secure channel. The operation of establishing the channel may include an operation of establishing a session. The session may be a secure session. For example, the session may be a TLS session. The LPA 110 may authenticate the notification server 230.

According to an embodiment, in operation 1507, the LPA 110 may transmit a notification to the notification server 230. In operation 1509, the LPA 110 may obtain a response to the notification.

According to an embodiment, in operation 1511, after obtaining the response, the LPA 110 may request or instruct the eUICC 120 to remove the notification from a list. The LPA 110 may deliver a notification removal message indicating the removal of the notification from the list, to the eUICC 120 so as to remove the notification. For example, the message may be 'removenotificationfromlist'. The notification removal message may include the sequence number. The sequence number may be the sequence number of a notification to be removed.

According to an embodiment, in operation 1513, the eUICC 120 may remove the notification in response to the request or command. The eUICC 120 may remove the notification indicated by the request or command, from storage. For example, the notification may be indicated by the sequence number.

According to an embodiment, in operation 1515, the notification server 230 may establish a channel with the SM-DP+ server 221. The channel may be a secure channel. The operation of establishing a channel may include an operation of establishing a session. The session may be a secure session. For example, the session may be a TLS session. The notification server 230 may perform authentication on the SM-DP+ server 221.

According to an embodiment, in operation 1517, the notification server 230 may transmit a notification to the SM-DP+ server 221. According to an embodiment, the notification may be a notification obtained from the LPA 110.

According to an embodiment, the notification server 230 may obtain a response from the SM-DP+ server 221 in response to the notification. The operations of the notification server 230 may be divided into (1) and (2) depending on the response. (1) indicates a case where the response is a success response; (2) indicates a case where the response is a failure response.

According to an embodiment, in operation 1519, the notification server 230 may obtain the success response. In response to the response, in operation 1521, the notification server 230 may remove the notification corresponding to the notification transmitted in operation 1517. For example, when the response includes the HTTP status code '2xx' that starts with 2, the notification server 230 may remove the notification.

According to an embodiment, in operation 1523, the notification server 230 may obtain the failure response. In operation 1525, the notification server 230 may retransmit the notification to the SM-DP+ server 221, in response to obtaining the failure response. When the response includes the HTTP status code '4xx' starting with 4 or the HTTP status code '5xx' starting with 5, the notification server 230 may remove the notification.

According to an embodiment, an electronic device may include a wireless communication circuit providing at least one cellular wireless communication, a secure element including profile information including notification configuration information as profile information associated with the wireless communication, at least one processor operatively connected to the wireless communication circuit and the secure element, and a memory operatively connected to the at least one processor. The at least one processor may be configured to obtain the notification configuration information from the secure element, to transmit a notification associated with profile management to an external server, and obtain a response indicating a failure of the notification from the external server, in response to the notification, and to retry transmission of the notification based on the notification configuration information.

According to an embodiment, the notification configuration information may include an information field associated with the retry.

According to an embodiment, the notification configuration information may include at least one of an information field associated with a profile owner, an information field associated with profile policy rules, or an information field associated with proprietary data.

According to an embodiment, an operation of the profile management may include at least one of "profile download", "profile installation", "profile enable", "profile disable", "profile delete", or "profile list".

According to an embodiment, the processor may be configured to perform the profile management, to obtain a notification list including the notification from the secure element in response to the profile management, and to transmit the notification to the external server in response to obtaining the notification list.

According to an embodiment, the processor may be configured to set a timer associated with a retry based on the notification configuration information, and to retry the transmission of the notification to the external server in response to an expiration of the timer.

According to an embodiment, the processor may be configured to set a timer associated with removal based on the notification configuration information, and to remove the notification in response to an expiration of the timer.

According to an embodiment, the notification configuration information may include information associated with a maximum retry count. The processor may be configured to retry the transmission of the notification to the external server while a count of the retry is within the maximum retry count.

According to an embodiment, the processor may be configured to remove the notification from the secure element when the count of the retry satisfies the maximum retry count.

According to an embodiment, the response may include a hypertext transfer protocol (HTTP) status code indicating a state of the notification. The HTTP status code may be one of remaining codes other than a code starting with "2" among a plurality of codes.

According to an embodiment, the profile information may further include at least one of identification of a profile included in the secure element, a profile nickname, a service provider name, a profile name, a profile class, a profile owner, subscription manager-data preparation+(SM-DP+) proprietary data, or profile policy rules.

According to an embodiment, the external server may be a SM-DP+ server.

According to an embodiment, the notification may be generated by the secure element in response to the profile management.

According to an embodiment, a method performed by an electronic device including a secure element may include obtaining profile information including notification configuration information from the secure element; transmitting a notification associated with profile management to an external server, obtaining a response indicating a failure of the notification from the external server, in response to the notification, and retrying the notification based on the notification configuration information.

According to an embodiment, the notification configuration information may include an information field associated with the retry of the notification.

According to an embodiment, the profile management may include at least one of "profile download", "profile installation", "profile enable", "profile disable", "profile delete", or "profile list".

According to an embodiment, the method may further include performing the profile management and obtaining a notification list including the notification from the secure element in response to the profile management. The transmitting of the notification to the external server may include transmitting the notification to the external server in response to obtaining the notification list.

According to an embodiment, the method may further include driving a timer associated with the retry based on the notification configuration information. The retrying may include retrying notification transmission to the external server in response to expiration of the timer.

According to an embodiment, the method may further include setting a timer associated with removal of the notification based on the notification configuration information. The retrying may include removing the notification in response to expiration of the timer.

According to an embodiment, the notification configuration information may include information associated with a maximum retry count. The retrying may include retrying the transmission of the notification to the external server while a count of the retry is within the maximum retry count.

FIG. 16 is a block diagram illustrating an electronic device 1601 in a network environment 1600 according to various embodiments.

Referring to FIG. 16, the electronic device 1601 in the network environment 1600 may communicate with an electronic device 1602 via a first network 1698 (e.g., a short-range wireless communication network), or an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input device 1650, a sound output device 1655, a display device 1660, an audio module 1670, a sensor module 1676, an interface 1677, a haptic module 1679, a camera module 1680, a power management module 1688, a battery 1689, a communication module 1690, a subscriber identification module (SIM) 1696, or an antenna module 1697. In some embodiments, at least one (e.g., the display device 1660 or the camera module 1680) of the components may be omitted from the electronic device 1601, or one or more other components may be added in the electronic device 1601. In some embodiments, some of the components may be implemented as single integrated circuitry. For example, the sensor module 1676 (e.g., a fingerprint sensor, an iris sensor, or an illuminance sensor) may be implemented as embedded in the display device 1660 (e.g., a display).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may load a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), and an auxiliary processor 1623 (e.g., a graphics processing unit (GPU), an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display device 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data or output data for a command related thererto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input device 1650 may receive a command or data to be used by other component (e.g., the processor 1620) of the electronic device 1601, from the outside (e.g., a user) of the electronic device 1601. The input device 1650 may include, for example, a microphone, a mouse, or a keyboard.

The sound output device 1655 may output sound signals to the outside of the electronic device 1601. The sound output device 1655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1660 may visually provide information to the outside (e.g., a user) of the electronic device 1601. The display device 1660 may include, for example, a display, a hologram device, or a projector and control circuitry to control a corresponding one of the display, hologram device, and projector. According to an embodiment, the display device 1660 may include touch circuitry adapted to detect a touch, or sensor circuitry (e.g., a pressure sensor) adapted to measure the intensity of force incurred by the touch.

The audio module 1670 may convert a sound into an electrical signal and vice versa. According to an embodiment, the audio module 1670 may obtain the sound via the input device 1650, or output the sound via the sound output device 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector), The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. According to an embodiment, the antenna module 1697 may include one or more antennas, and, therefrom, at least one antenna appropriate for a communication scheme used in the communication network, such as the first network 1698 or the second network 1699, may be selected, for example, by the communication module 1690 (e.g., the wireless communication module 1692). The signal or the power may then be transmitted or received between the communication module 1690 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601.

According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601).

For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a wireless communication circuit configured to provide cellular wireless communication;
    an eUICC (embedded universal integrated circuit card including profile information associated with the cellular wireless communication;
    at least one processor operatively connected to the wireless communication circuit and the eUICC; and
    a memory operatively connected to the at least one processor,
    wherein the at least one processor is configured to:
    obtain notification configuration information including a first notification indicating a profile management operation for the profile from the eUICC;

transmit the first notification to an SM-DP+ (subscription manager-data preparation+) server via the cellular wireless communication; and obtain a response indicating a failure of the first notification from the SM-DP+ server, in response to the first notification, the response including a status code;

when the status code corresponds to a first value, filter out notifications for the same event from a list of notifications associated with the eUICC;

when there is a remaining notification other than the first notification after the filtering, set a timer with a first length;

when there is no remaining notification other than the first notification after the filtering, set the timer with a second length shorter than the first length; and retry transmission of the first notification while the set timer is running.

2. The electronic device of claim 1, wherein the notification configuration information includes at least one of an information field associated with a profile owner, an information field associated with profile policy rules, or an information field associated with proprietary data.

3. The electronic device of claim 2, wherein the profile management operation includes at least one of "profile download", "profile installation", "profile enable", "profile disable", "profile delete", or "profile list".

4. The electronic device of claim 1, wherein the processor is configured to:

remove the first notification in response to an expiration of the set timer.

5. The electronic device of claim 1, wherein the notification configuration information includes information associated with a maximum retry count, and wherein the processor is configured to:

while a count of the retry is within the maximum retry count, retry the transmission of the first notification to the external server.

6. The electronic device of claim 5, wherein the processor is configured to:

when the count of the retry equals to the maximum retry count, remove the first notification from the eUICC.

7. The electronic device of claim 1, wherein the status code includes a hypertext transfer protocol (HTTP) status code indicating a state of the first notification.

8. The electronic device of claim 1, wherein the profile information includes at least one of identification of a profile, a profile nickname, a service provider name, a profile name, a profile class, a profile owner, subscription manager-data preparation+ (SM-DP+) proprietary data, or a profile policy.

9. A method performed by an electronic device including an eUICC (embedded universal integrated circuit card), the method comprising:

obtaining notification configuration information including a first notification from the secure eUICC;

transmitting the first notification associated with profile management for a profile stored in the eUICC to SM-DP+ (subscription manager-data preparation+) server via cellular wireless communication;

obtaining a response indicating a failure of the first notification from the SM-DP+ server, in response to the first notification, the response including a status code;

when the status code corresponds to a first value, filtering out notifications for the same event from a list of notifications associated with the eUICC;

when there is a remaining notification other than the first notification after the filtering, setting a timer with a first length;

when there is no remaining notification other than the first notification after the filtering, setting the timer with a second length shorter than the first length; and retrying transmission of the first notification while the set timer is running.

* * * * *